(12) United States Patent
Lundgard et al.

(10) Patent No.: US 9,422,444 B2
(45) Date of Patent: *Aug. 23, 2016

(54) COATING COMPOSITIONS

(71) Applicant: Dow Global Technologies LLC, Midland, MI (US)

(72) Inventors: Richard A. Lundgard, Midland, MI (US); Houxiang Tang, Midland, MI (US); Jeffrey Wilbur, Midland, MI (US); Jinghang Wu, Midland, MI (US); David L. Malotky, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/653,319

(22) PCT Filed: Dec. 13, 2013

(86) PCT No.: PCT/US2013/075032
§ 371 (c)(1),
(2) Date: Jun. 18, 2015

(87) PCT Pub. No.: WO2014/105464
PCT Pub. Date: Jul. 3, 2014

(65) Prior Publication Data
US 2015/0344718 A1 Dec. 3, 2015

Related U.S. Application Data

(63) Continuation of application No. 13/729,084, filed on Dec. 28, 2012, now Pat. No. 8,779,053.

(51) Int. Cl.
*B32B 17/10* (2006.01)
*B32B 15/08* (2006.01)
(Continued)

(52) U.S. Cl.
CPC ............ *C09D 123/12* (2013.01); *C09D 123/06* (2013.01); *C09D 123/0815* (2013.01);
(Continued)

(58) Field of Classification Search
CPC ............... C09D 123/06; C09D 191/06; C09D 123/142; C09D 123/0815; C09D 123/12; C08L 23/0896; C08L 51/06; C08L 2205/02; C08L 2201/54; C08L 2205/03; Y01T 428/31692; Y01T 428/263
USPC ..................... 428/334, 461; 524/112; 526/348
See application file for complete search history.

(56) References Cited

U.S. PATENT DOCUMENTS 2,898,233 A 8/1959 Hmiel
3,166,613 A 1/1965 Wright et al.
(Continued)

FOREIGN PATENT DOCUMENTS

DE 4428382 2/1996
EP 0277003 8/1988
(Continued)

OTHER PUBLICATIONS

International Search Report from related PCT Application PCT/US2004027641 completed Dec. 8, 2004.
(Continued)

*Primary Examiner* — William Cheung
(74) *Attorney, Agent, or Firm* — Brooks, Cameron & Huebsch, PLLC

(57) ABSTRACT

Embodiments of the present disclosure are directed towards coating compositions comprising from 20 to 85 percent of an aqueous dispersion based on a total weight of the coating composition, a basic water composition, and a crosslinker, wherein the aqueous dispersion comprises a melt blending product of (a) a base polymer comprising a polyolefin, (b) a polymeric performance improving agent (c) a polymeric stabilizing agent, and (d) a polymeric coupling agent.

13 Claims, 6 Drawing Sheets

(51) Int. Cl.
  *C08K 5/00* (2006.01)
  *C08F 210/00* (2006.01)
  *C09D 123/12* (2006.01)
  *C09D 123/08* (2006.01)
  *C09D 191/06* (2006.01)
  *C09D 123/06* (2006.01)
  *C09D 123/14* (2006.01)

(52) U.S. Cl.
  CPC .......... *C09D123/142* (2013.01); *C09D 191/06* (2013.01); *C08L 2201/54* (2013.01); *C08L 2205/02* (2013.01); *Y10T 428/263* (2015.01); *Y10T 428/31692* (2015.04)

(56) References Cited

U.S. PATENT DOCUMENTS

| | | |
|---|---|---|
| 3,245,934 A | 4/1966 | Krzyszkowski |
| 3,422,049 A | 1/1969 | McClain |
| 3,432,483 A | 3/1969 | Peoples et al. |
| 3,456,044 A | 7/1969 | Pahlke |
| 3,554,994 A | 1/1971 | Maloney et al. |
| 3,645,992 A | 2/1972 | Elston |
| 3,741,253 A | 6/1973 | Brax et al. |
| 3,746,681 A | 7/1973 | McClain |
| 3,843,576 A | 10/1974 | Parkinson |
| 3,908,050 A | 9/1975 | Gor |
| 4,038,477 A | 7/1977 | Inoue et al. |
| 4,076,698 A | 2/1978 | Anderson et al. |
| 4,199,622 A | 4/1980 | Kokumai et al. |
| 4,352,849 A | 10/1982 | Mueller |
| 4,540,736 A | 9/1985 | Herten et al. |
| 4,542,199 A | 9/1985 | Kaminsky et al. |
| 4,543,399 A | 9/1985 | Jenkins, III et al. |
| 4,551,380 A | 11/1985 | Schoenberg |
| 4,588,790 A | 5/1986 | Jenkins, III et al. |
| 4,597,920 A | 7/1986 | Golike |
| 4,599,392 A | 7/1986 | McKinney et al. |
| 4,689,351 A | 8/1987 | Endo et al. |
| 4,749,616 A | 6/1988 | Liu et al. |
| 4,752,597 A | 6/1988 | Turner |
| 4,798,081 A | 1/1989 | Hazlitt et al. |
| 4,808,561 A | 2/1989 | Welborn, Jr. |
| 4,818,785 A | 4/1989 | Otawa et al. |
| 4,820,557 A | 4/1989 | Warren |
| 4,837,084 A | 6/1989 | Warren |
| 4,865,902 A | 9/1989 | Golike et al. |
| 4,871,705 A | 10/1989 | Hoel |
| 4,897,455 A | 1/1990 | Welborn, Jr. et al. |
| 4,912,075 A | 3/1990 | Chang |
| 4,927,708 A | 5/1990 | Herran et al. |
| 4,937,217 A | 6/1990 | Chang |
| 4,937,301 A | 6/1990 | Chang |
| 4,952,451 A | 8/1990 | Mueller |
| 4,963,419 A | 10/1990 | Lustig et al. |
| 4,988,781 A | 1/1991 | McKinney et al. |
| 4,996,259 A | 2/1991 | Koehler et al. |
| 5,008,288 A | 4/1991 | Stracher et al. |
| 5,017,714 A | 5/1991 | Welborn, Jr. |
| 5,028,670 A | 7/1991 | Chinh et al. |
| 5,059,481 A | 10/1991 | Lustig et al. |
| 5,086,025 A | 2/1992 | Chang |
| 5,120,867 A | 6/1992 | Welborn, Jr. |
| 5,132,262 A | 7/1992 | Rieger et al. |
| 5,147,949 A | 9/1992 | Chang |
| 5,198,401 A | 3/1993 | Turner et al. |
| 5,228,531 A | 7/1993 | Patterson et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,360,648 A | 11/1994 | Falla et al. |
| 5,364,486 A | 11/1994 | Falla et al. |
| 5,387,568 A | 2/1995 | Ewen et al. |
| 5,387,635 A | 2/1995 | Rowland et al. |
| 5,391,629 A | 2/1995 | Turner et al. |
| 5,504,172 A | 4/1996 | Imuta et al. |
| 5,539,021 A | 7/1996 | Pate et al. |
| 5,545,504 A | 8/1996 | Keoshkerian et al. |
| 5,574,091 A | 11/1996 | Walther et al. |
| 5,677,383 A | 10/1997 | Chum et al. |
| 5,721,025 A | 2/1998 | Falla et al. |
| 5,756,659 A | 5/1998 | Hughes et al. |
| 5,798,410 A | 8/1998 | Walther et al. |
| 5,844,045 A | 12/1998 | Kolthammer et al. |
| 5,869,575 A | 2/1999 | Kolthammer et al. |
| 5,874,139 A | 2/1999 | Bosiers et al. |
| 5,879,768 A | 3/1999 | Falla et al. |
| 5,938,437 A | 8/1999 | DeVincenzo |
| 5,942,579 A | 8/1999 | Falla et al. |
| 6,106,822 A | 8/2000 | Rademacher et al. |
| 6,111,023 A | 8/2000 | Chum et al. |
| 6,117,465 A | 9/2000 | Falla |
| 6,130,266 A | 10/2000 | Mihayashi et al. |
| 6,221,191 B1 | 4/2001 | Davis et al. |
| 6,235,143 B1 | 5/2001 | Crighton et al. |
| 6,316,549 B1 | 11/2001 | Chum et al. |
| 6,339,123 B1 | 1/2002 | Raetzsch et al. |
| 6,448,341 B1 | 9/2002 | Kolthammer et al. |
| 6,448,621 B1 | 9/2002 | Thakur |
| 6,455,636 B2 | 9/2002 | Sanada et al. |
| 6,525,157 B2 | 2/2003 | Cozewith |
| 6,538,070 B1 | 3/2003 | Cardwell et al. |
| 6,566,446 B1 | 5/2003 | Parikh et al. |
| 6,767,956 B2 | 7/2004 | Choudhery et al. |
| 6,777,096 B2 | 8/2004 | Shiba et al. |
| 6,833,045 B1 | 12/2004 | Tokita et al. |
| 6,960,635 B2 | 11/2005 | Stevens et al. |
| 7,803,865 B2 | 9/2010 | Moncla et al. |
| 7,947,776 B2 | 5/2011 | Moncla et al. |
| 8,063,128 B2 | 11/2011 | Moncla et al. |
| 8,158,711 B2 | 4/2012 | Moncla et al. |
| 8,779,053 B2 * | 7/2014 | Lundgard ............ C09D 123/06 524/523 |
| 8,946,329 B2 * | 2/2015 | Wilbur ................. C09D 7/1241 428/339 |
| 9,169,406 B2 * | 10/2015 | Wilbur ................... C09D 7/125 |
| 2001/0011118 A1 | 8/2001 | Sanada |
| 2002/0146509 A1 | 10/2002 | Kodokian et al. |
| 2003/0157354 A1 | 8/2003 | Van Veghel et al. |
| 2003/0158341 A1 | 8/2003 | Walton |
| 2003/0191231 A1 | 10/2003 | Martin et al. |
| 2003/0204017 A1 | 10/2003 | Stevens et al. |
| 2004/0024094 A1 | 2/2004 | Stemmler |
| 2004/0027593 A1 | 2/2004 | Wilkins |
| 2004/0242784 A1 | 12/2004 | Tau et al. |
| 2005/0100754 A1 | 5/2005 | Moncla et al. |
| 2005/0271888 A1 | 12/2005 | Moncla et al. |
| 2006/0211781 A1 | 9/2006 | Strandburg et al. |
| 2008/0161487 A1 | 7/2008 | Dorr et al. |
| 2010/0143837 A1 | 6/2010 | Klier et al. |
| 2015/0299495 A1 * | 10/2015 | Wilbur ................... C09D 7/125 428/461 |

FOREIGN PATENT DOCUMENTS

| | | |
|---|---|---|
| EP | 0277004 | 8/1988 |
| EP | 0359045 | 3/1990 |
| EP | 0426637 | 5/1991 |
| EP | 0427697 | 5/1991 |
| EP | 0495375 | 7/1992 |
| EP | 0520732 | 12/1992 |
| EP | 0525205 | 2/1993 |
| EP | 0573403 | 12/1993 |
| EP | 0696244 | 2/1996 |
| EP | 1718318 | 6/1996 |

(56) References Cited

FOREIGN PATENT DOCUMENTS

| | | |
|---|---|---|
| EP | 0760828 | 3/1997 |
| EP | 0972794 | 1/2000 |
| EP | 1035166 | 9/2000 |
| EP | 1193282 | 4/2002 |
| EP | 1245603 | 10/2002 |
| EP | 1312654 | 5/2003 |
| EP | 1394202 | 3/2004 |
| GB | 1271572 | 4/1972 |
| GB | 1370964 | 10/1974 |
| JP | 02-26631 | 1/1990 |
| JP | 05-105791 | 4/1993 |
| JP | 2002047444 | 2/2002 |
| JP | 2008239691 | 10/2008 |
| WO | 9200333 | 1/1992 |
| WO | 9523038 | 8/1995 |
| WO | 0001745 | 1/2000 |
| WO | 0164774 | 9/2001 |
| WO | 0206275 | 1/2002 |
| WO | 02062875 | 8/2002 |
| WO | 02064856 | 8/2002 |
| WO | 02081205 | 10/2002 |
| WO | 02083753 | 10/2002 |
| WO | 03025058 | 3/2003 |
| WO | 03027170 | 4/2003 |
| WO | 03040201 | 5/2003 |
| WO | 03093355 | 11/2003 |
| WO | 2005021622 | 3/2005 |
| WO | 2005026275 | 3/2005 |
| WO | 2005090427 | 9/2005 |
| WO | 2011011705 | 1/2011 |
| WO | 2011011707 | 1/2011 |
| WO | 2011142949 | 11/2011 |
| WO | 2012091806 | 7/2012 |

OTHER PUBLICATIONS

International Search Report from related PCT Application PCT/US2005/006493 completed May 31, 2005.

Randall, "A Review of High Resolution Liquid 13 Carbon Nuclear Magnetic Resonance Characterizations of Ethylene-Based Polymers" JMS-REV, Journal of Macromolecular Science, Part C: Polymer Reviews, 1989, pp. 201-317.

Scholte, et al. "Mark-Houwink Equation and GPC Calibration for Linear Short-Chain Branched Polyolefins, Including Polypropylene and Ethylene-Propylene Copolymers", Journal of Applied Science, vol. 29, 1984, pp. 3763-3782.

Otocka, et al. "Distribution of Long and Short Branches in Low Density Polyethylenes", Macromolecules, vol. 4, No. 4, 1971, pp. 507-512.

International Search Report from related PCT Application PCT/US2011/026878 dated Oct. 25, 2011, 4 pages.

Wicks, et al. "Organic Coatings" Science and Technology, 2nd edition, 1999, pp. 246-257.

Jenkins, et al. Multi-Layer Films, Packaging Foods with Plastics, 1991, pp. 19-27.

Butler, "Coextrusion", Coextrusion Basics, 1992, Chapter 4, pp. 31-80.

Williams, et al. "The Construction of a Polyethylene calibration Curve for Gel Permeation Chromatography using Polystryrene Fractions", Journal of Polymer Science, Polymer Letters, vol. 6, 1968, pp. 621-624.

Wild, et al. "Determination of Branching Distributions in Polyethylene and Ethylene Copolymers", Journal of Polymer Science, vol. 20, 1982, pp. 441-455.

Houben-Weyl, "Methoden der Organischen Chemie, Band E20", Makromolekulare Soffe, Polyester, 1987, pp. 1405-1429.

* cited by examiner

US 9,422,444 B2

COATING COMPOSITIONS

This application is a National Stage Application under 35 U.S.C. §371 of International Application Number PCT/US2013/075032, filed Dec. 13, 2013 and published as WO 2014/105464 on Jul. 3, 2014, which claims the benefit to U.S. Continuation In Part application Ser.No. 13/729,084, filed Dec. 28, 2012, published as U.S. Publication No. 2013/0130021 on May 23, 2013, and granted and assigned U.S. Pat. No. 8,779,053 on Jul. 15, 2014, the entire contents of which are incorporated herein by reference in its entirety.

FIELD OF DISCLOSURE

Embodiments of the present disclosure are directed to coating compositions, more specifically, embodiments are coating compositions that include a base polymer comprising a polyolefin and a polymeric performance improving agent.

BACKGROUND

Coating compositions can be applied to substrates and be cured, e.g. crosslinked, to provide a coating on the substrate. There are various coating compositions utilized to provide differing coatings. Coatings can be utilized to provide protection of the substrate, provide a base for a subsequent application such as a decorative coating, reduce friction to help provide for improved handling, and provide protection for contents stored within a container formed from the coated substrate, among others.

Some substrates, e.g., metal substrates, can be formed into containers, such as food and/or beverage containers. Coating compositions can be applied to the substrates and/or to the interior and/or the exterior of these containers.

SUMMARY

The present disclosure provides coating composition comprising from 20 to 85 percent of an aqueous dispersion based on a total weight of the coating composition, wherein the aqueous dispersion comprises a melt blending product of (a) a base polymer comprising a polyolefin, (b) a polymeric performance improving agent (c) a polymeric stabilizing agent, and (d) a polymeric coupling agent, wherein the aqueous dispersion has a solid content from 15 weight percent to 70 weight percent based on a total weight of the aqueous dispersion, the solid content comprises from 40 to 80 percent by weight of the base polymer based on a total weight of the solids content, from 3 to 35 percent by weight of the polymeric performance improving agent based on the total weight of the solids content, from 2 to 35 percent by weight of the polymeric stabilizing agent based on the total weight of the solids content, and from 5 to 15 percent by weight of the polymeric coupling agent based on the total weight of the solids content; a basic water composition comprising from 90 to 99.99 percent by weight of water based on a total weight of the basic water composition and from 0.01 percent to 10 percent by weight of a neutralizing agent based on the total weight of the basic water composition, wherein the basic water composition is from 0 weight percent to 80 weight percent of the coating composition based on the total weight of the coating composition; and a crosslinker, wherein the crosslinker is from 0 weight percent to 40 weight percent of the coating composition based on the total weight of the coating composition.

The present disclosure provides coated articles comprising a substrate and a coating on the substrate, wherein the coating includes the coating composition.

The present disclosure provides coated articles comprising a substrate and a cured coating on the substrate, wherein the cured coating is formed by curing the coating composition.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
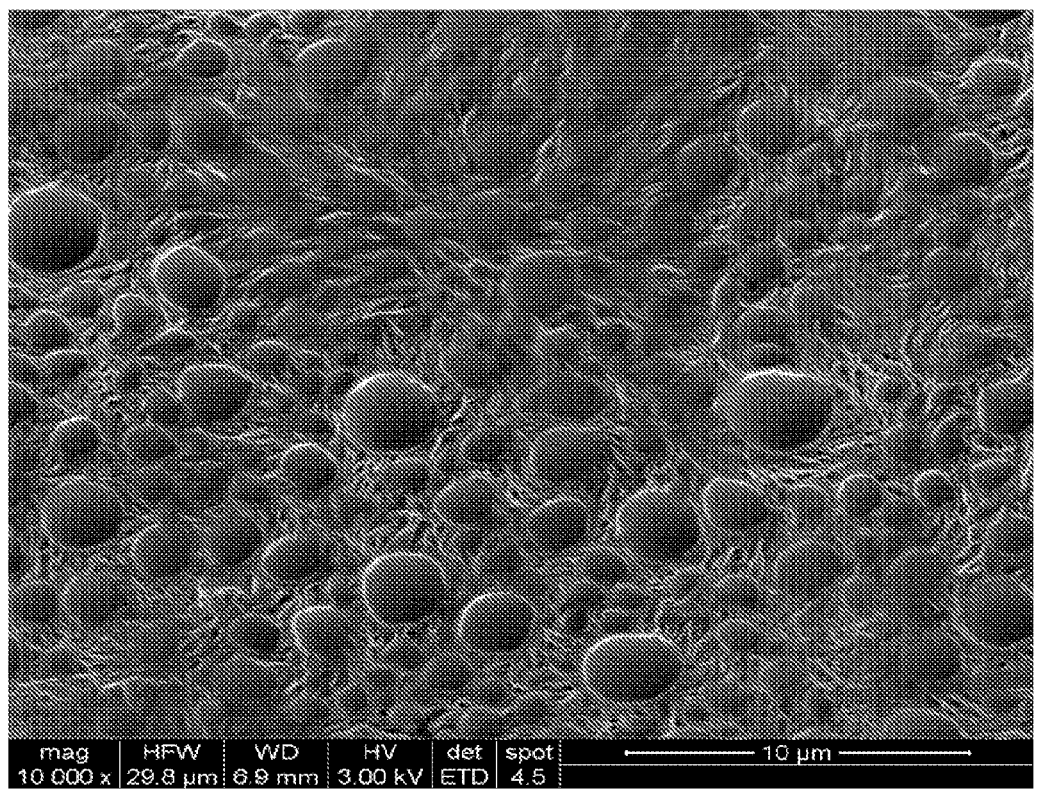
FIG. 1 illustrates a scanning electron microscope (SEM) image of the coated article with a cured coating of Example 23.
Figure 2:
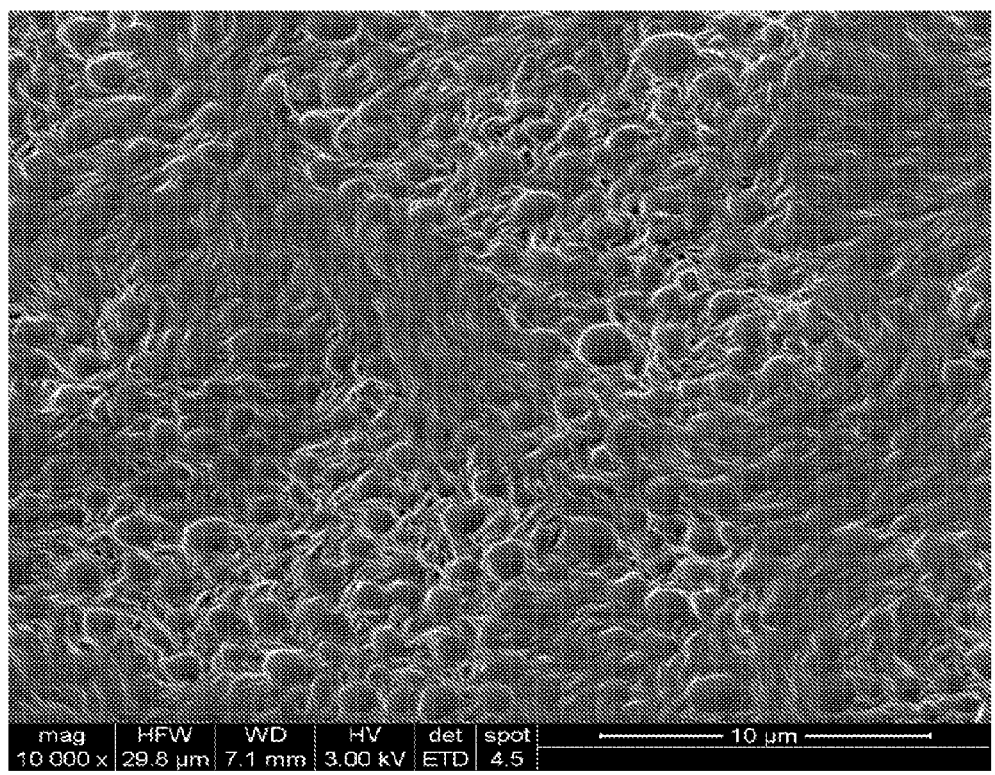
FIG. 2 illustrates a scanning electron microscope (SEM) image of the coated article with a cured coating of Example 25.
Figure 3:
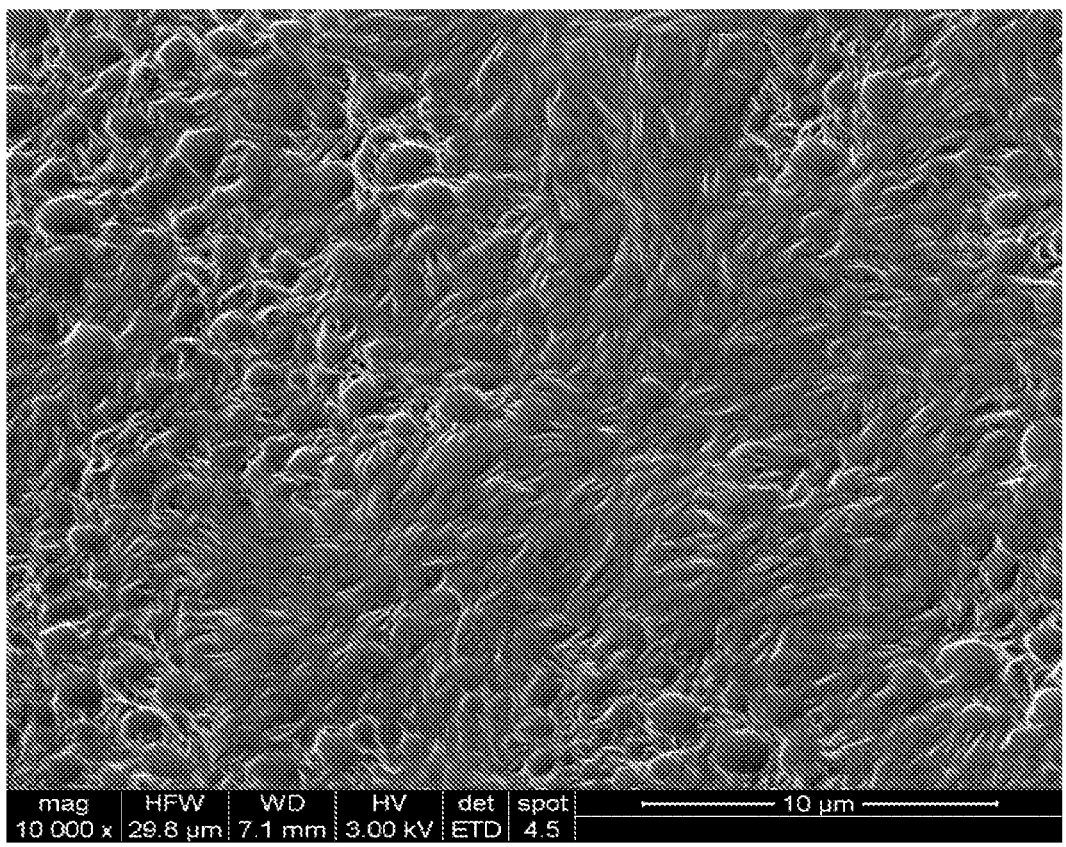
FIG. 3 illustrates a scanning electron microscope (SEM) image of the coated article with a cured coating of Example 27.
Figure 4:
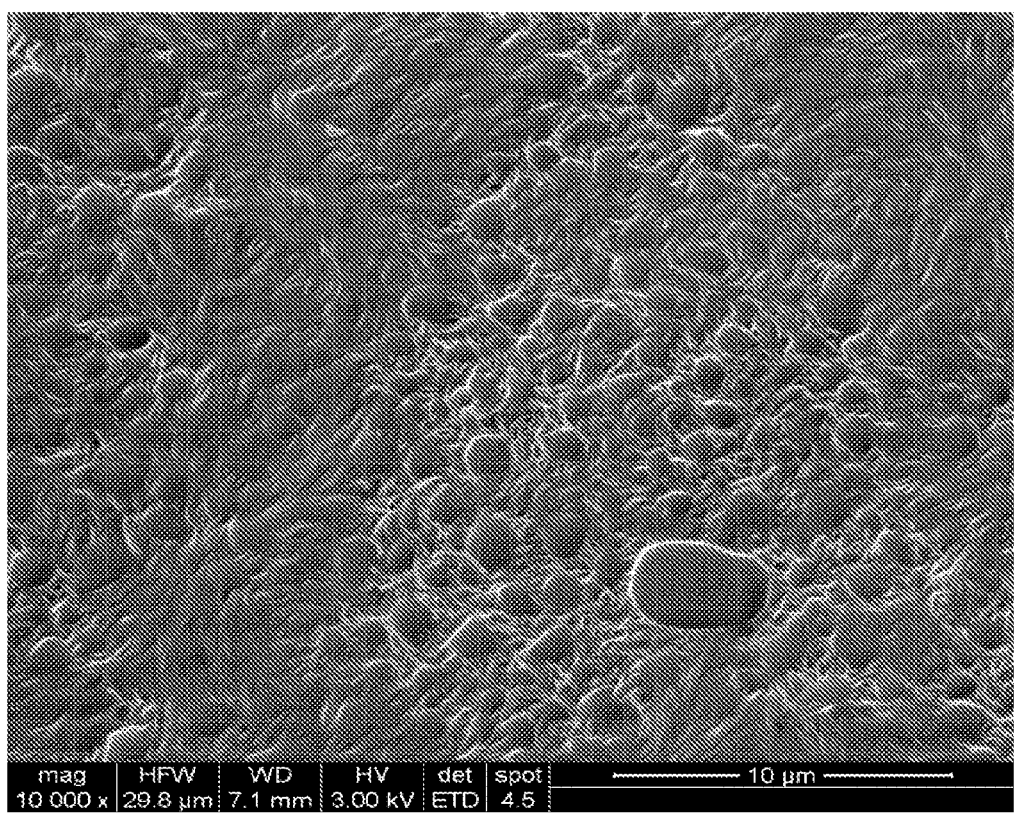
FIG. 4 illustrates a scanning electron microscope (SEM) image of the coated article with a cured coating of Example 28.
Figure 5:
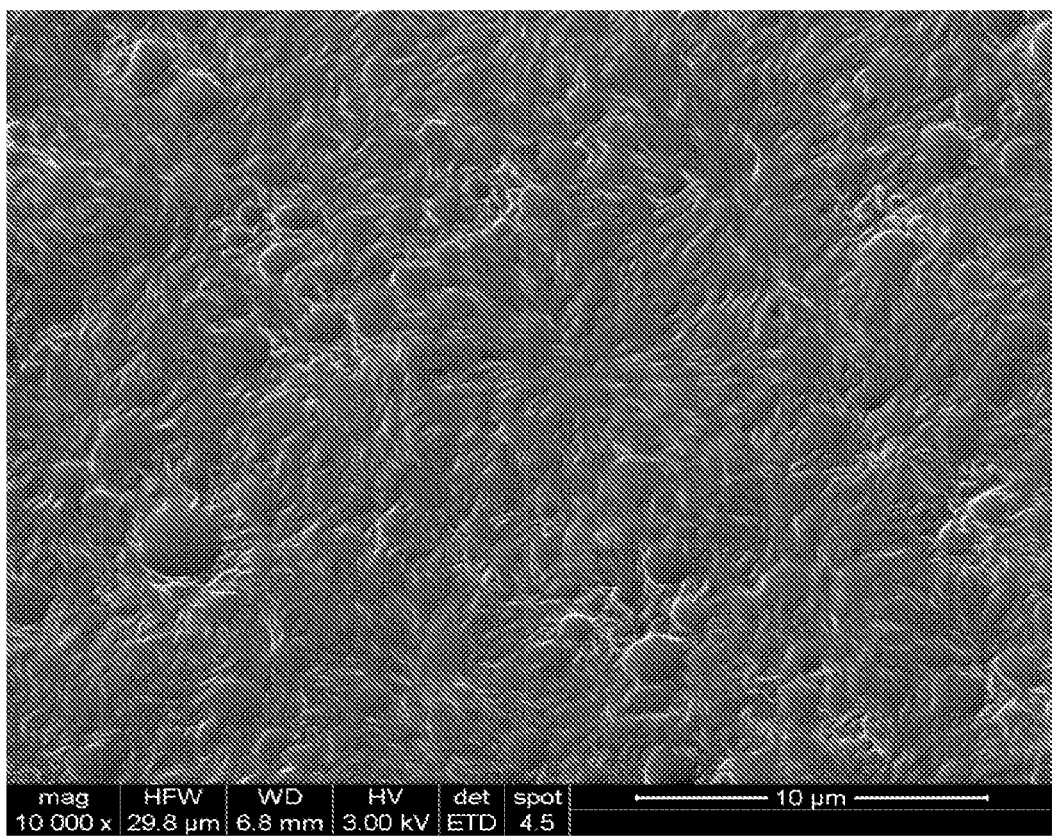
FIG. 5 illustrates a scanning electron microscope (SEM) image of the coated article with a cured coating of Example 30.

Coating compositions are described herein. These coating compositions can include an aqueous dispersion comprising (a) a base polymer comprising a polyolefin (b) a polymeric performance improving agent (c) a polymeric stabilizing agent, and (d) a polymeric coupling agent.

For some coating applications, it is desirable that a coated article simultaneously provide particular performance characteristics, such as particular mechanical and chemical resistance properties and particular performance properties. Surprisingly, it has been found that the coating compositions disclosed herein, which include an aqueous dispersion comprising (a) a base polymer comprising a polyolefin (b) a polymeric performance improving agent (c) a polymeric stabilizing agent, and (d) a polymeric coupling agent, and a crosslinker can provide these performance characteristics, including particular mechanical and chemical resistance properties and particular appearance properties, which are desirable for some coating applications.

Embodiments of the present disclosure provide coating compositions that comprise an aqueous dispersion including a melt blending product of (a) a base polymer comprising a polyolefin (b) a polymeric performance improving agent (c) a polymeric stabilizing agent, and (d) a polymeric coupling agent.

As mentioned, embodiments of the present disclosure provide that the aqueous dispersion can include (a) a base polymer comprising a polyolefin. For example, the base polymer can comprise polypropylene and/or polyethylene.

The base polymer comprising a polyolefin can have a density greater than 0.88 grams per cubic centimeter (g/cm$^3$). For example, the base polymer comprising the polyolefin can have a density in a range from 0.88 to 1.1 g/cm$^3$, 0.89 to 1.0 g/cm$^3$, 0.90 to 0.98 g/cm$^3$, or 0.91 to 0.97 g/cm$^3$.

Embodiments of the present disclosure provide that the base polymer can comprise polypropylene and/or polyethylene, such as high density polyethylene, medium density polyethylene, low density polyethylene, or combinations thereof. As used herein, high density polyethylene refers to polyethylene having a density in a range from 0.93 to 0.97 grams per cubic centimeter g/cm$^3$. All individual values and subranges from 0.93 to 0.97 g/cm$^3$ are included herein and disclosed herein; for example, the high density polyethylene can have a density from a lower limit of 0.93, 0.931, or 0.935 g/cm$^3$ to an upper limit of 0.97, 0.969, or 0.965 g/cm$^3$. For example, the high density polyethylene can have a density from 0.93 to 0.97 g/cm$^3$, 0.931 to 0.969 g/cm$^3$, or 0.965 to 0.97 g/cm$^3$. As used herein, medium density polyethylene refers to polyethylene having a density less than the high density polyethylene. As used herein, low density polyethylene refers to polyethylene having a density less than the medium density polyethylene.

Embodiments of the present disclosure provide that the (a) a base polymer comprising a polyolefin comprises homopolymers and/or copolymers, including elastomers, of a polyolefin, e.g., polymers of polyethylene and/or polypropylene. Examples of the polyolefin include, but are not limited to, homopolymers and copolymers, including elastomers, of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers, including elastomers, of an alpha-olefin with a conjugated or non-conjugated diene, as can be represented by ethylene-butadiene copolymer and ethylene-ethylidene norbornene copolymer; and polyolefins, including elastomers, such as copolymers of two or more alpha-olefins with a conjugated or non-conjugated diene, as can be represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer.

According to a number of embodiments of the present disclosure, the polyolefin may include a functionalized polyolefin based on polypropylene or polyethylene homopolymer or copolymer where the polymer has been modified with a hydroxyl, an amine, an aldehyde, an epoxide, an ethoxylate, a carboxylic acid, an ester, an anhydride group, or combinations thereof. Some of these functionalized polyolefins based on polypropylene or polyethylene homopolymers or copolymers, are available, for example, from Baker Petrolite, a subsidiary of Baker Hughes, Inc.

According to a number of embodiments of the present disclosure, the polyolefin may include an unfunctionalized polyolefin, such as commercially available high density polyethylenes including, but not limited to, DMDA-8007 NT 7 (Melt Index 8.3, Density 0.965), DMDC-8910 NT 7 (Melt Index 10, Density 0.943), DMDA-1210 NT 7 (Melt Index 10, Density 0.952), HDPE 17450N (Melt Index 17, Density 0.950), DMDA-8920 NT 7 (Melt Index 20, Density 0.954), DMDA 8940 NT 7 (Melt Index 44, Density 0.951), DMDA-8950 NT 7 (Melt Index 50, Density 0.942), DMDA-8965-NT 7 (Melt Index 66, Density 0.952), all available from The Dow Chemical Company, among others. Other examples of base polymers are propylene-ethylene alternating copolymers and propylene-ethylene diblock copolymers and propylene-ethylene alternating copolymers e.g., those available under the trade name VERSIFY™, such as VERSIFY™ 4200, VERSIFY™ 4000, VERSIFY™ 3200, VERSIFY™ 3000, and VERSIFY™ 3300, all available from The Dow Chemical Company. Examples of polypropylene base polymer are PP 6D43 from Braskem America; and PP 35R80 from Propilco S.A.

The polyolefin may have different molecular weights for various applications. For example, the polyolefin may have a molecular weight of greater than 800 grams/mole; for example, greater than 5000 grams/mole; or in the alternative, greater than 50000 grams/mole. The polyolefin may have different melting points for various applications. For example, the polyolefin may have a crystalline melting point of greater than 100° C.; greater than 101° C.; greater than 102° C.; greater than 103° C.; or greater than 105° C.

According to a number of embodiments of the present disclosure the polyolefin may be a propylene-alpha olefin copolymer, for example, propylene-ethylene or a propylene-ethylene-butene copolymer or interpolymer. The polyolefin may be a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The polyolefin, e.g., the propylene/alpha-olefin copolymer, may have a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the polyolefin may have a crystallinity in the range of from at least 1 percent by weight (a heat of fusion of at least 2 Joules/gram) to 24 percent by weight (a heat of fusion of less than 40 Joules/gram); or in the alternative, the polyolefin may have a crystallinity in the range of from at least 1 percent by weight (a heat of fusion of at least 2 Joules/gram) to 15 percent by weight (a heat of fusion of less than 24.8 Joules/gram); or in the alternative, the polyolefin may have a crystallinity in the range of from at least 1 percent by weight (a heat of fusion of at least 2 Joules/gram) to 7 percent by weight (a heat of fusion of less than 11 Joules/gram); or in the alternative, the polyolefin may have a crystallinity in the range of from at least 1 percent by weight (a heat of fusion of at least 2 Joules/gram) to 5 percent by weight (a heat of fusion of less than 8.3 Joules/gram). The crystallinity can be measured via a Differential scanning calorimetry (DSC) method. Embodiments provide that the base polymer can include units derived from propylene and polymeric units derived from one or more alpha-olefin comonomers. Examples of comonomers that can be utilized to manufacture the base polymer are $C_2$, and $C_4$ to $C_{10}$ alpha-olefins; for example, $C_2$, $C_4$, $C_6$ and $C_8$ alpha-olefins. The base polymer can include from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the base polymer can comprise from 1 to 35 percent by weight of units derived from one or more alpha-olefin comonomers; or in the alternative, the base polymer can comprise from 1 to 30 percent by weight of units derived from one or more alpha-olefin comonomers; or in the alternative, the base polymer can comprise from 3 to 27 percent by weight of units derived from one or more alpha-olefin comonomers; or in the alternative, the base polymer can comprise from 3 to 20 percent by weight of units derived from one or more alpha-olefin comonomers; or in the alternative, the base polymer can comprises from 3 to 15 percent by weight of units derived from one or more alpha-olefin comonomers.

The base polymer can have a molecular weight distribution (MWD), defined as weight average molecular weight divided by number average molecular weight ($M_w/M_n$) of 3.5 or less; in the alternative 3.0 or less; or in another alternative from 1.8 to 3.0.

In a number of embodiments of the present disclosure, the base polymer can be characterized as including between 60 and 100, preferably between 80 and 99 and more preferably between 85 and 99, weight percent of units derived from polyethylene, e.g., high density polyethylene, and between greater than zero and 40, preferably between 1 and 20, more preferably between 4 and 16 and even more preferably between 4 and 15, weight percent units derived from at least one other polyolefin.

In a number of embodiments of the present disclosure, the base polymer can be characterized as including between 60 and 100, preferably between 80 and 99 and more preferably between 85 and 99, weight percent of units derived from polypropylene, and between greater than zero and 40, preferably between 1 and 20, more preferably between 4 and 16 and even more preferably between 4 and 15, weight percent units derived from at least one other polyolefin.

Embodiments of the present disclosure provide that the aqueous dispersion can include (b) polymeric performance improving agent. The polymeric performance improving agent can help to simultaneously provide particular performance characteristics, such as particular appearance properties and particular mechanical and chemical resistance properties for a coated article, which are desirable for some coating applications.

The polymeric performance improving agent can have an acid number of less than 60, less than 50, or for a number of embodiments, less than 42. Acid number can be determined by ASTM D-1386, for example. Acid number can refer to an amount of KOH in mgKOH/g polymer required to neutralize acid functionality when measured by titration.

The polymeric performance improving agent can have a melt index value of less than 100, less than 70, or for a number of embodiments, less than 30. Melt index values can be determined by ASTM D-1238, for example. Melt index values can be defined as the amount of polymer melt passing in dg/min (or g/10 min) through a heated syringe with a plunger load, e.g., at 190° C. and 2.16 kg load for polyethylene based polymer and at 230° C. and 2.16 kg for polypropylene based polymer.

Embodiments of the present disclosure provide that the polymeric performance improving agent can be a maleic anhydride functionalized polyethylene, such as high density polyethylene. Maleic anhydride functionalized polyethylene copolymers, terpolymers and blends may also be used. Maleic anhydride functionality can be incorporated into the polymer by grafting or other reaction methods. When grafting, the level of maleic anhydride incorporation is typically below 3 percent by weight based on the weight of the polymer. Examples of commercially available maleic anhydride functionalized polyethylene include those available under the tradename AMPLIFY™ available from The Dow Chemical Company, such as AMPLIFY™ GR-204, among others. Amplify GR-204 is 2,5-Furandione modified ethylene/hexene-1 polymer. Other examples of maleic anhydride functionalized polyethylene are available under the tradename FUSABOND™ available from E.I. du Pont de Nemours and Company such as FUSABOND™ E-100, FUSABOND™ E-158, FUSABOND™ E265, FUSABOND™ E528, FUSABOND™ E-589, FUSABOND™ M-603, among others; Other maleic anhydride grafted polyethylene polymers, copolymers, and terpolymers may include POLYBOND™ available from Chemtura, such as POLYBOND™ 3009 and POLYBOND™ 3029, among others; OREVAC™ available from ARKEMA, such as OREVAC™ 18510P, among others; PLEXAR™ from Lyondell Chemical Company, such as PLEXAR™ PX-2049; also grades available under the tradename YPAREX from B.V. DSM Engineering Plastics, such as YPAREX 8305; and polymers available under the tradename EXXELOR™, such as Exxelor™ PE 1040. Other examples include LOTADER available from ARKEMA, such as LOTADER 4210 a random terpolymer of ethylene, acrylic ester and maleic anhydride. Additional polyethylene functionalized with glycidyl methacrylate may be used. Other examples of the polymeric performance improving agent include polymers such as propylene-ethylene alternating copolymers and propylene-ethylene diblock copolymers e.g., propylene-ethylene alternating copolymers, available under the trade name VERSIFY™, such as VERSIFY™ 4200, VERSIFY™ 4000, VERSIFY™ 3200, VERSIFY™ 3000, and VERSIFY™ 3300, all available from The Dow Chemical Company.

Embodiments of the present disclosure provide that the polymeric performance improving agent is from 3 to 35 percent by weight of the aqueous dispersion based on the total weight of the solids content of the aqueous dispersion. All individual values and subranges from 3 to 35 percent by weight of the aqueous dispersion based on the total weight of the solids content of the aqueous dispersion are included herein and disclosed herein; for example, the polymeric performance improving agent can be from a lower limit of 3, 4, or 5 percent by weight of the aqueous dispersion based on the total weight of the solids content of the aqueous dispersion to an upper limit of 35, 30, or 16 percent by weight of the aqueous dispersion based on the total weight of the solids content of the aqueous dispersion. For example, the aqueous dispersion can comprise from 3 to 35 percent by weight of the aqueous dispersion based on the total weight of the solids content of the aqueous dispersion, 4 to 30 percent by weight of the aqueous dispersion based on the total weight of the solids content of the aqueous dispersion, or 4 to 16 percent by weight of the aqueous dispersion based on the total weight of the solids content of the aqueous dispersion.

Embodiments of the present disclosure provide that the aqueous dispersion can include (c) a polymeric stabilizing agent. The polymeric stabilizing agent can help to promote formation of a stable dispersion, e.g., the aqueous dispersion.

The polymeric stabilizing agent can have an acid number of greater than 100, greater than 110, or for a number of embodiments greater than 140.

For example, the stabilizing agent can be a polar polymer, e.g., including a polar group as either a comonomer or grafted monomer. In some embodiments, the stabilizing agent can include one or more polar polyolefins, e.g., having a polar group as either a comonomer or grafted monomer.

Examples of polymeric stabilizing agents include, but are not limited to, ethylene-acrylic acid and ethylene-methacrylic acid copolymers, such as those available under the trademarks PRIMACOR™, such as PRIMACOR™ 5980i, commercially available from The Dow Chemical Company, NUCREL™, commercially available from E. I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other examples of polymeric stabilizing agents include, but are not limited to, ethylene ethyl acrylate copolymer, ethylene methyl methacrylate, ethylene butyl acrylate, and combinations thereof. Other ethylene-carboxylic acid copolymer may also be used. Those having ordinary skill in the art will recognize that a number of other useful polymers may also be used.

In some embodiments, the stabilizing agent can include a functionalized polyolefin, e.g., a polypropylene or polyethylene homopolymer or copolymer in which the polymer has been modified with a hydroxyl, an amine, an aldehyde, an epoxide, an ethoxylate, a carboxylic acid, an ester, an anhydride group, or combinations thereof. Some of functionalized polyolefins such as polypropylene or polyethylene homopolymers and copolymers are available, for example, from Baker Petrolite, a subsidiary of Baker Hughes, Inc.

For a number of embodiments, the stabilizing agent can include a surfactant. Examples of the surfactant include, but are not limited to, cationic surfactants, anionic surfactants, non-ionic surfactants, and combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide, and silicone surfactants.

The stabilizing agent can include an external surfactant and/or an internal surfactant, for example. External surfactants are surfactants that do not become chemically reacted into the polyolefin during dispersion preparation. Examples of external surfactants include, but are not limited to, salts of dodecyl benzene sulfonic acid and lauryl sulfonic acid salt. Internal surfactants are surfactants that do become chemically reacted into the polyolefin during dispersion preparation.

Examples of commercially available surfactants include, but are not limited to: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

The stabilizing agent can include solution or suspension polymers, e.g., polymers of ethylenically unsaturated monomers such as acrylic and/or methacrylic acid and their ($C_1$-$C_{30}$) esters or amides; acrylamide/methacrylamide and their N-substituted derivatives; acrylonitrile; styrene and substituted styrene derivatives.

The stabilizing agent can include a polymeric stabilizing agent. Examples of polymeric stabilizing agents include, but are not limited to, amphiphilic copolymer compositions, the copolymer including the reaction product of from 5 weight percent to 95 weight percent of one or more hydrophilic monomers and from 5 weight percent to 95 weight percent of one or more copolymerizable ethylenically unsaturated hydrophobic monomers. These materials can be water soluble and/or emulsifiable, for example upon neutralization and can act as colloidal stabilizers.

Examples of nonionic monomers useful for production of amphiphilic copolymer compositions, include, but are not limited to, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate and N-vinyl pyrrolidone, and allyl monomers such as allyl (meth)acrylate.

Examples of monomers useful for production of amphiphilic copolymer compositions include, but are not limited to, unsaturated amide functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, and N-methylolacrylamide; monomers containing quaternary ammonium salts such as tributylammonium ethyl(meth)acrylate chloride, diallyldimethylammonium chloride, methylacrylamidopropyltrimethylammonium chloride, acrylamidopropyltrimethylammonium chloride, polyquaternium-11 and polyquaternium-4; and amine functionalized monomers such as vinylimidazole.

"Anionic" or "acid-containing monomer" useful for production of amphiphilic copolymer compositions include, but are not limited to, ethylenically unsaturated monomers containing carboxylic acid, phosphonic acid, phosphinic acid, sulfinic acid, sulfonic acid groups, and anhydrides that are subsequently hydrolyzed. Suitable examples include (meth) acrylic acid, maleic acid, fumaric acid, itaconic acid, vinyl phosphonic acid, phosphoethyl (meth)acrylate, and vinylsulfonic acid.

According to a number of embodiments, one or more of the stabilizing agents may be based on resins such as polyester, epoxy resins, polyamide resins, which might be reacted with acrylic resins or acrylic monomers to form polyester acrylate, polyamide acrylates, and epoxy resin acrylates.

Polyester resins useful for producing stabilizing agents may be obtained in accordance with conventional procedures well known to those of ordinary skill in the art by reacting, for example, a polybasic acid that contains at least two carboxyl groups per polybasic acid molecule (e.g. an at least dibasic polycarboxylic acid) with a polyhydric alcohol that contains at least two hydroxyl groups in the polyhydric alcohol (e.g., at least dihydric alcohol) in presence of a conventional esterification catalyst at an elevated temperature with or without solvent present. Alternatively alkyl esters of the polycarboxylic acids or anhydrides of polycarboxylic acids can be reacted in presence of a conventional esterification catalyst at an elevated temperature. One or more polymerizable double bonds may be included into the polyester by employing a polybasic acid that contains polymerizable double bonds and/or a polyhydric alcohol that contains polymerizable double bonds.

The stabilizing agent may include a polyester acrylate. Polyester acrylates may be formed via in-situ polymerization of copolymerizable ethylenically unsaturated monomers in presence of polyesters. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid. Polyester acrylates in solvents can be dried according to suitable methods known to those of ordinary skill in the art.

The stabilizing agent may include an epoxy resin. Epoxy resins may be obtained in accordance with conventional procedures well known to those of ordinary skill in the art, e.g., by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines. Examples of epoxies include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Other epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present.

The stabilizing agent may include an epoxy acrylate. The epoxy acrylates may be formed via in-situ polymerization of copolymerizable ethylenically unsaturated monomers in presence of epoxy resins. Examples include, but are not limited to, ethylenically unsaturated mono- or polyfunctional acids, ethylenically unsaturated mono- or polyfunctional acid esters, amides, nitriles as well as vinyl monomers and vinyl ester with an epoxy resins in or without presence of a reaction fluid. Alternatively a polymeric acid functional acrylic resin can be reacted with an epoxy resin in the presence of a suitable catalyst to form epoxy acrylate. Epoxy acrylates in solvents can be dried according to suitable methods known to those of ordinary skill in the art.

Embodiments of the present disclosure provide that the aqueous dispersion can include (d) a polymeric coupling agent. The polymeric coupling agent can help in formation of the aqueous dispersion, e.g., help provide a more uniform dispersion, and/or improve properties of a cured coating composition. Coupling agents may also be referred to as compatiblizers.

The polymeric coupling agent can have a melt viscosity of less than 80000 centipoise (cP) at 150° C., less than 40000 cP at 150° C., less than 20000 cP at 150° C., or for a number of embodiments, less than 10000 cP at 150° C. Melt viscosity can be determined by DIN 53019 or ASTM D-1986, e.g., measurement of wax viscosity using a Brookfield rotational viscometer. For a number of embodiments, the polymeric coupling agent can have an acid number less than 100.

The polymeric coupling agent can include a modified, e.g., functionalized, polymer, such as a functionalized polyolefin, and optionally a low molecular weight compound having reactive polar groups. Examples of the polymeric coupling agent include, but are not limited to modified olefin polymers. The modified olefin polymers can include graft copolymers and/or block copolymers, such as propylene-maleic anhydride graft copolymer. Examples of groups that can modify the polymer include, but are not limited to, acid anhydrides, carboxylic acids, carboxylic acid derivatives, primary and secondary amines, hydroxyl compounds, oxazoline and epoxides, and ionic compounds, and combinations thereof. Specific examples of the groups that can modify the polymer include, but are not limited to, unsaturated cyclic anhydrides and their aliphatic diesters, and the diacid derivatives. For example, maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid, and combinations thereof. Commercially available examples of polymeric coupling agents include, but are not limited to, polymers available under the trade name LICOCENE® from Clariant Corporation, such as LICOCENE® PE MA, which is a maleic anhydride modified polyethylene wax and LICOCENE® PP MA, which is a maleic anhydride modified polypropylene wax; polymers under the trade name A-C™ Performance Additives from Honeywell Corporation, such as AC-575™ which is an ethylene maleic anhydride copolymer, and AC-392™ and AC-395™ which are high density oxidized polyethylene; products under the trade name CERAMER from Baker-Hughes Company, such as CERAMER 1608; PA-18 polyanhydride copolymer from Chevron-Phillips Company, EXXELOR™ from ExxonMobil Chemical Company; and Epolene from Westlake Chemical Company.

The aqueous dispersion includes a fluid medium, e.g., water. The aqueous dispersion can comprise 30 weight percent to 85 weight percent of water based on a total weight of the aqueous dispersion; for example the aqueous dispersion can comprise 35 weight percent to 80 weight percent, 40 weight percent to 75 weight percent, or 45 weight percent to 70 weight percent of water based on a total weight of the aqueous dispersion.

Accordingly, the aqueous dispersion can comprise a solids content that is 15 weight percent to 70 weight percent based on the total weight of the aqueous dispersion; for example the aqueous dispersion can have solids content that is 20 weight percent to 68 weight percent, 25 weight percent to 65 weight percent, or 30 weight percent to 60 weight percent based on the total weight of the aqueous dispersion.

The solids content of the aqueous dispersion can comprise 40 to 80 percent by weight of the base polymer based on a total weight of the solids content; for example the solids content of the aqueous dispersion can comprise 55 to 80 percent, or 60 to 80 percent by weight of the base polymer based on the total weight of the solids content.

The solids content of the aqueous dispersion can comprise 3 to 35 percent by weight of the polymeric performance improving agent based on the total weight of the solids content; for example the solids content of the aqueous dispersion can comprise 3 to 35 percent by weight of the polymeric performance improving agent based on the total weight of the solids content, 4 to 30 percent by weight of the polymeric performance improving agent based on the total weight of the solids content, 4 to 20 percent by weight of the polymeric performance improving agent based on the total weight of the solids content, or 4 to 16 percent by weight of the polymeric performance improving agent based on the total weight of the solids content.

The solids content of the aqueous dispersion can comprise 2 to 35 percent by weight of the stabilizing agent based on the total weight of the solids content; for example the solids content of the aqueous dispersion can comprise 2 to 30 percent, or 5 to 20 percent by weight of the stabilizing agent based on the total weight of the solids content.

The solids content of the aqueous dispersion can comprise 5 to 15 percent by weight of the polymeric coupling agent based on the total weight of the solids content; for example the solids content of the aqueous dispersion can comprise 5 to 13 percent, or 5 to 10 percent by weight of the polymeric coupling agent based on the total weight of the solids content.

The aqueous dispersion can be from 20 to 85 weight percent of the coating composition based on a total weight of the coating composition; for example the aqueous dispersion can be 55 to 80 weight percent, or 60 to 75 weight percent of the coating composition based on the total weight of the coating composition. For a number of embodiments, the aqueous dispersion can be 100 weight percent of the coating composition based on a total weight of the coating composition.

According to a number of embodiments of the present disclosure, the aqueous dispersion can comprise a neutralizing agent, e.g., such that the aqueous dispersion has a pH in a range from 8 to 11. All individual values and subranges from 8 to 11 are included herein and disclosed herein; for example, the aqueous dispersion can have a pH from a lower limit of 8, 8.1, 8.2, or 8.3 to an upper limit of 11, 10.9, 10.8, or 10.7. For example, the aqueous dispersion can have a pH from 8 to 11, 8.1 to 10.9, 8.2 to 10.8, or 8.3 to 10.7. Examples of the neutralizing agent include, but are not limited to, hydroxides, carbonates, amines, and combinations thereof. Examples of hydroxides include, but are not limited to, ammonium hydroxide, potassium hydroxide, lithium hydroxide, and sodium hydroxide. Examples of carbonates include, but are not limited to sodium carbonate, sodium bicarbonate, potassium carbonate, and calcium carbonate. Examples of amines include, but are not limited to monoethanolamine, diethanolamine, triethanolamine, ammonia, monomethylamine, dimethylamine, trimethylamine, 2-amino-2-methyl-1-propanol, triisopropanolamine, diisopropanolamine, N,N-dimethylethanolamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris (hydroxymethyl)-aminomethane, N,N,N'N'-tetrakis(2-hydroxylpropyl) ethylenediamine, 1,2-diaminopropane, 2-amino-2-hydroxymethyl-1,3-propanediol, N,N'-ethylenebis[bis(2-hydroxypropyl)amine]toluene-p-sulphonate, and combinations thereof. As an example, the aqueous dispersion can comprise a basic water composition. The basic water composition can comprise from 90 to 99.99 percent by weight of water based on a total weight of the basic water composition and from 0.01 percent to 10 percent by weight of a neutralizing agent, as discussed herein, based on the total weight of the basic water composition. Embodiments of the present disclosure provide that the basic water composition is from 0 weight percent to 80 weight percent of the coating composition based on the total weight of the coating composition.

The aqueous dispersions can be formed by various processes recognized by those having skill in the art. Embodiments provide that one or more base polymers, a performance improving agent, a polymeric stabilizing agent, and a polymeric coupling agent are melt-kneaded in an extruder, e.g. via a BLUEWAVE™ process, to form a melt blending product. Water and a neutralizing agent, e.g., a base, such as ammonia, potassium hydroxide, or a combination thereof can be utilized to form an aqueous dispersion, e.g., an aqueous polyolefin dispersion. In a number of embodiments, the aqueous dispersion is first diluted to contain about 1 to about 3% by weight water and then, subsequently, further diluted to comprise greater than about 25% by weight water.

Various melt-kneading processes known in the art may be used. In some embodiments, a kneader, a BANBURY® mixer, single-screw extruder, or a multi-screw extruder, e.g. a twin screw extruder, may be utilized. A process for producing the aqueous dispersions in accordance with the present disclosure is not particularly limited. For example, an extruder, in certain embodiments, for example, a twin screw extruder, is coupled to a back pressure regulator, melt pump, or gear pump. Embodiments also provide a base reservoir and an initial water reservoir, each of which includes a pump. Desired amounts of base and initial water can be provided from the base reservoir and the initial water reservoir, respectively. Various suitable pumps may be used, but in some embodiments, for example, a pump that provides a flow of about 150 cc/min at a pressure of 240 bar can be used to provide the base and the initial water to the extruder. In other embodiments, a liquid injection pump provides a flow of 300 cc/min at 200 bar or 600 cc/min at 133 bar. In some embodiments, the base and initial water are preheated in a preheater. For example, in a number of embodiments, one or more base polymers, e.g., in the form of pellets, powder, or flakes, can be fed from the feeder to an inlet of an extruder where the polymers are melted or compounded. In some embodiments, a dispersing agent can be added to the one or more base polymers through and along with the resin and in other embodiments, a dispersing agent can be provided separately to the extruder. The melted polymers can then be delivered from the mix and convey zone to an emulsification zone of the extruder where an initial amount of water and/or base from the water and base reservoirs can be added through an inlet. In some embodiments, a dispersing agent may be added additionally or exclusively to the water stream. In some embodiments, further dilution water may be added via water inlet from a water reservoir to a dilution and cooling zone of the extruder. The aqueous dispersion can be diluted, e.g., to at least 30 weight percent water, in the cooling zone. Further dilution may occur a number of times until the desired dilution level is achieved. In some embodiments, water is not added into the twin screw extruder but rather to a stream containing the melt product after the melt product has exited from the extruder. In this manner, steam pressure build-up in the extruder is eliminated and the aqueous dispersion is formed in a secondary mixing device such as a rotor stator mixer.

In one or more embodiments, a process for producing the aqueous dispersion comprises the steps of (1) selecting a base polymer comprising high density polyethylene or polypropylene; (2) selecting a polymeric performance improving agent; (3) selecting a polymeric stabilizing agent; (4) selecting a polymeric coupling agent; (5) selecting a liquid media comprising water; (6) optionally selecting one or more neutralizing agents; (7) melt-blending the a base polymer comprising high density polyethylene or polypropylene, the polymeric performance improving agent, the polymeric stabilizing agent, and the polymeric coupling agent in the presence of water and optionally one or more neutralizing agents; (6) thereby forming an emulsified mixture; (7) contacting the emulsified mixture with additional dilution water while optionally removing heat therefrom; (8) thereby forming solid particles dispersed in the water; and (9) thereby forming the aqueous dispersion.

The aqueous dispersion, e.g., the solid content, can have an average volume particle size diameter in the range of from 400 to 2000 nanometers (nm). All individual values and subranges from 400 to 2000 nm are included herein and disclosed herein; for example, the aqueous dispersion can have an average volume particle size diameter from a lower limit of 400, 425, or 450 nm to an upper limit of 2000, 1800, or 1750 nm. For example, the aqueous dispersion can have an average volume particle size diameter from 400 to 2000 nm, 425 to 1800 nm, or 450 to 1750 nm.

Embodiments of the present disclosure provide that the coating compositions disclosed herein can be formed by combining the aqueous dispersion, as discussed herein, with one or more other components to form the coating compositions. The aqueous dispersion and one or more other components of the coating compositions, discussed further herein, can be combined by various processes. For example, the aqueous dispersion and other components of the coating compositions can be mixed manually, by utilizing a mixer such as a static mixer, also referred as in-line mixers, and/or by utilizing an agitated vessel, such as an agitated tank to form the coating compositions disclosed herein, among other processes.

The coating compositions disclosed herein can comprise a basic water composition. The basic water composition includes a neutralizing agent. Examples of the neutralizing agent include, but are not limited to, those neutralizing agents discussed herein.

The basic water composition can comprise from 90 to 99.9 percent by weight of water based on a total weight of the basic water composition. All individual values and subranges from 90 to 99.99 percent by weight of water based on a total weight of the basic water composition are included herein and disclosed herein; for example, the percent by weight of water based on a total weight of the basic water composition can be from a lower limit of 90, 90.5, 91, or 93 to an upper limit of 99.99, 99.9, 99, or 98 percent. For example, the basic water composition can comprise from 90 to 99.99, 90.5 to 99.9, 91 to 99, or 93 to 98 percent by weight of water based on a total weight of the basic water composition. The basic water composition can comprise from 0.01 to 10 percent by weight of a neutralizing agent based on the total weight of the basic water composition. All individual values and subranges from 0.01 to 10 percent by weight of the neutralizing agent based on a total weight of the basic water composition are included herein and disclosed herein; for example, the percent by weight of the neutralizing agent based on a total weight of the basic water composition can be from a lower limit of 0.01, 0.1, 1, or 2 to an upper limit of 10, 9.5, 9, or 7 percent. For example, the basic water composition can comprise from 0.01 to 10, 0.1 to 9.5, 1 to 9, or 2 to 7 percent by weight of the neutralizing agent based on a total weight of the basic water composition.

The coating compositions disclosed herein can comprise a crosslinker. The crosslinker can be from 0 to 40 weight percent of the coating composition based on the total weight of the coating composition. All individual values and subranges from 0 to 40 weight percent are included herein and disclosed herein; for example, the crosslinker can be from a lower limit of 0, 0.01, 0.02, or 0.1, to an upper limit of 40, 30, or 20 weight percent of the coating composition based on the total weight of the coating composition. For example, the crosslinker can be from 0 to 40 weight percent, 0.01 to 40 weight percent, 0.02 to 30 weight percent, or 0.1 to 20 weight percent of the coating composition based on the total weight of the coating composition.

Embodiments of the present disclosure provide that the crosslinker may be a compound, which reacts with a reactive functional group contained in the coating composition; thereby facilitating the crosslinking between such functional groups. Such functional groups can be present in components of the aqueous dispersion, for example in (a) the base polymer, (b) the polymeric stabilizing agent, and/or (c) the compatiblizer. For example, reactive functional groups include, but are not limited to, acid groups such as carboxylic acid groups, free or in the neutralized form, or any functional groups having another active hydrogen by another component such as alcohol groups, amino groups, or the like.

Crosslinkable functional groups in the crosslinker are groups capable of reacting with the reactive functional groups of the coating compositions. For example, a carbodiimide group, an oxazoline group, an isocyanate group, a hydroxyalkylamide group, an epoxy group, a methylol group, an aldehyde group, an acid anhydride group, a hydroxy group, an aziridinyl group, and/or a silane group can be for the crosslinker.

Another possibility of crosslinking acid functional groups is by use of multivalent metal ions by reaction of the aforementioned acid groups with a multivalent metal ion containing substance, such as zinc oxide. Carboxylic acids could also be crosslinked in reactions with multifunctional olefinic unsaturated substances under catalysis of a strong acid. Multifunctional carbonates could also react with carboxylic acids to give ester linkages with liberation of carbon dioxide. Also, polyolefinic materials may be crosslinked via free radical crosslinking, initiated by addition of peroxides or via radiation, e.g., electron beam.

According to a number of embodiments the crosslinker comprises phenol-formaldehyde resins; hydroxyalkylamide resins; amino-formaldehyde resins including, but not limited to, urea-formaldehyde resins, melamine formaldehyde resins, benzoguanamine formaldehyde resins, anhydride resins; epoxy group containing resins, including, but not limited, to epoxy resins, epoxy group containing polyester or acrylic resins and blocked isocyanate resins, and combinations of two or more thereof, provided that the combinations of such crosslinkers is compatible.

The crosslinker may be a waterdispersed, waterdispersible, or water-soluble substance. According to a number of embodiments, examples of the crosslinker include, but are not limited to, an aqueous monomeric or polymeric substance, which contains two or more oxazoline groups, carbodiimide groups, hydroxyalkylamide groups, epoxy groups, isocyanate groups, methylol groups etc. or several of these per molecule.

An example of an oxazoline crosslinker is an aqueous polymer having two or more oxazoline groups in its molecules, which can be obtained by polymerizing an oxazoline group-containing monomer and, as required, an ethylenic unsaturated monomer. Alternatively an oxazoline crosslinker can also be obtained by reaction between a nitrile group and an aminoethanol group, dehydration of a hydroxylalkylamide group and the like.

Crosslinkers having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures. Monofunctional isocyanates may be included, e.g., to control the resin molecular chain length, such as phenyl isocyanate, tolyl isocyanate, cyclohexylisocyanate, dimethylphenyl isocyanate, butylisocyanate, and naphthyl isocyanate are useful. Diisocyanate substances may be partially reacted with aliphatic compounds, alicyclic compounds, or aromatic compounds having a hydroxyl group, an imino group, an amino group, a carboxyl group, a mercapto group, an epoxy group, and the like. In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide,3-methyl-2-phospholene-1-oxide, 1-ethyl-2-phospholene-1-oxide, and 3-phospholene isomers thereof.

To convert a carbodiimide group-containing polymer into an aqueous polymer, a hydrophilic segment can be provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxygroup or an ethoxy group).

The crosslinker, e.g. an aqueous crosslinker, may contain an epoxy group; examples include, but are not limited to, sorbitol polyglycidyl ether, glycerol triglycidyl ether, polyglycerol polyglycidyl ether, trimethylolpropane triglycidyl ether, poly(ethyleneglycol) diglycidyl ether, poly(propyleneglycol) diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00, and XZ 92446.00 from The Dow Chemical Company.

Examples of the anhydride compound include, but are not limited to, aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechin; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

The crosslinker, e.g. an aqueous crosslinker, containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of the crosslinker derived from aldehyde are water-dispersed or water-dispersible or water-soluble phenol formaldehyde resins, amino formaldehyde resins or combinations thereof.

Phenol formaldehyde crosslinkers include, but are not limited to, reaction products of aldehydes with phenols. Examples of aldehdydes include, but are not limited to, formaldehyde and acetaldehyde. Various phenols can be used such as, but not limited to, phenol, cresol, p-phenylphenol, p-tert-butylphenol, p-tert-amylphenol, cyclopentylphenol, cresylic acid, bisphenol-A, bisphenol-F, and the like, and combinations thereof. Examples of commercially available phenol formaldehyde crosslinkers include resole-formaldehyde resins, such as BAKELITE™ 6581LB, available from Bakelite A. G, and PHENODUR™ PR 612, available from CYTEC Industries, among others. Also acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinkers include, but are not limited to, reaction products of aldehydes with amino or amido group containing molecules. Examples of aldehydes include, but are not limited to, formaldehyde and acetaldehyde. Various amino or amido group containing molecules can be used such as, but not limited to, urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Examples of commercially available amino-formaldehyde resins which are water soluble or water dispersible and useful for the instant purpose include Cymel™ 301, Cymel™ 303, Cymel™ 370, and Cymel™ 373, from Cytec Surface Specialties. Other aldehydes used to react with the amino compound to form the resinous material are crotonic aldehyde, acrolein, or compounds which generate aldehydes, such as hexamethylene-tetramine, paraldehyde, and the like.

A number of embodiments provide that the crosslinker comprises a hydroxyalkyl amide. The crosslinkers can be water-soluble and be employed to crosslink carboxylic acid. Examples of hydroxyalkyl amides include, but are not limited to, Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260.

A number of embodiments provide that one or more crosslinkers may be added to the aqueous dispersion as part of the aqueous dispersion formulation process; or in the alternative, a number of embodiments provide that one or more crosslinkers may be added to the coating composition, e.g. the crosslinker may be added to the aqueous dispersion after the dispersion formulation process.

Depending on the coating application, e.g., the type of food and/or beverage that is to be contained in a coated container, and on desired coating properties it may be beneficial to combine several crosslinkers. Also, for some coating applications some crosslinkers may be more suited than others. Some crosslinkers may not be suited for particular coating applications. Some crosslinkers may be employed with the addition of catalysts for curing. Crosslinkers can help to build thermoset networks which are indicated by higher values of MEK Double Rubs, e.g., as compared to an identical coating composition not containing the crosslinker.

Embodiments of the present disclosure provide that the coating composition can include an antioxidant. The antioxidant can be from 0.001 weight percent to 0.1 weight percent of the coating composition based on the total weight of the coating composition. All individual values and subranges from 0.001 to 0.1 weight percent are included herein and disclosed herein; for example, the antioxidant can be from a lower limit of 0.001, 0.002, or 0.005, to an upper limit of 0.1, 0.09, or 0.07 weight percent of the coating composition based on the total weight of the coating composition. For example, the antioxidant can be from 0.001 to 0.1 weight percent, 0.002 to 0.09 weight percent, or 0.005 to 0.07 weight percent of the coating composition based on the total weight of the coating composition. The antioxidant can help to protect the aqueous dispersion, e.g., at high cure temperatures. Embodiments of the present disclosure provide that the antioxidant comprises a hindered phenolic. An example of the hindered phenolic includes, but is not limited to, pentaerythritol tetrakis(3-(3,5-di-tert-butyl-4-hydroxyphenyl)propionate, which is commercially available, such as IRGANOX™ 1010, available from BASF.

Embodiments of the present disclosure provide that the coating composition can include an additive. Examples of the additive include, but are not limited to, fillers, catalysts, wetting agents, defoamers, flow agents, release agents, slip agents, lubricants, anti-blocking agents, additives to mask sulfur staining, pigment wetting/dispersion agents, anti-settling agents, UV stabilizers, adhesion promoters, corrosion inhibitors, pigments, e.g. titanium dioxide, mica, calcium carbonate, barium sulfate, silica, zinc oxide, milled glass, aluminum trihydrate, talc, antimony trioxide, fly ash, and clay or the like; optionally one or more solvents, e.g. glycols, glycol ether, 2,2,4-trimethyl-1,3-pentanediol monoisobutyrate, mineral spirits, alcohols, and benzoate esters or the like; optionally one or more dispersants, e.g. aminoalcohols, and polycarboxylates, optionally one or more defoamers, optionally one or more preservatives, e.g. biocides, mildewcides, fungicides, algaecides, and combinations thereof, optionally one or more thickeners, e.g. cellulosic based thickeners such as hydroxyethyl cellulose, hydrophobically modified alkali soluble emulsions, hydrophobically modified ethoxylated urethane thickeners, and combinations thereof, among other additives. Different amounts of the various additives may be utilized for different coating applications.

As mentioned, the coating compositions disclosed herein may be applied to a substrate. Examples of the substrate include, but are not limited to, beverage cans, food cans; aerosol containers such as those for non-food products, e.g. hair spray, hair dye, or color spray lacquers; drums; kegs; pails; decorative tins; open trays; tubes; bottles; monoblocs; caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans, among others. Cans, to which the coating compositions disclosed herein may be applied, can be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have various shapes; for example, such can may have a cylindrical shape, cubical, spherical, semi-spherical, bottle shape, elongated cubical shape, shallow or tall shape, round or rectangular shape or other suitable shape, or a combination thereof. According to a number of embodiments, the substrate comprises a metal, e.g., a metal substrate. Examples of the metal include, but are not limited to, aluminum and aluminum alloys, steel, electrolytic tinplate cold rolled low carbon mild steel, electrolytic chromium/chromium oxide coated cold rolled low carbon mild steel, and other pre-treated steels. Pretreatment may include, but is not limited to, treatment with phosphoric acid, zirconium phosphate, chromium phosphate, and the like as well as silanes for reasons such as primary corrosion protection and improved adhesion. The metal substrate may comprise a sheet, strip or a coil. The substrate may be pre-coated with one or more pre-coating compositions. Such pre-coating compositions include, but are not limited to, one or more resin binders, one or more resin crosslinkers, one or more solvents, one or more additives, and one or more pigments. Examples of resin binders include, but are not limited to, epoxy, polyester, polyvinyl chloride containing organosols/vinyls, phenolic, alkyd, oleoresin, acrylic resin, and the like. Examples crosslinkers include, but are not limited to, phenol-formaldehyde resins; amino-formaldehyde resins including but not limited to urea-formaldehyde, melamine formaldehyde, benzoguanamine formaldehyde; anhydride resins, blocked isocyanate resins and epoxy groups containing resins, including but not limited to, epoxy resins, epoxy groups containing polyesters, acrylic resins, vinyl resins or the like. Examples of solvents and thinners include, but are not limited to, glycol ethers, alcohols, aromatics, e.g. aromatic hydrocarbons, white spirit, branched ketones and esters. Examples of additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal substrate.

The substrate may be formed via stamping, drawing, redrawing, wall ironing, bending, beading, embossing, debossing, flanging, necking, stretching, blow-stretching and/or other suitable conventional methods. Such methods are known to those having ordinary skill in the art. According to a number of embodiments, the coating compositions may, for example, be applied to the substrate, e.g. metal sheet or metal foil, and then the coated substrate may be formed into a coated article, e.g., a container device or a coated closure device. According to a number of embodiments, the substrate may be formed into a container, e.g., a container device or a closure device, and then the container device or the closure device can be coated with the coating compositions to form the coated article. The coating compositions may be applied by various methods; for example, via roller coating, spray coating, powder coating, dip coating, electrodeposition coating, printing, wash coating, flow coating, draw down coating, and/or curtain coating. The coating, i.e. the coating composition applied to the substrate, may have a thickness in the range of 0.01 micrometers (μm) to 2 millimeters (mm). All individual values and subranges from 0.01 μm to 2 mm are included herein and disclosed herein; for example, the coating may have a thickness from a lower limit of 0.01 μm, 0.05 μm, or 1 μm, to an upper limit of 2 mm, 1.5 mm, or 1 mm. For example, the coating may have a thickness 0.01 μm to 2 mm; 0.05 μm to 1.5 mm; or in the alternative, 0.1 μm to 1 mm. According to a number of embodiments, the coating may have a thickness in a range of 5 μm to 50 μm.

The coating composition applied to the substrate may be cured, e.g., to form a cured coating. The curing process can comprise drying, e.g., air drying, convection oven drying, hot air drying, and/or infrared oven drying, among others. According to a number of embodiments, the curing can include radiation cure, e.g. electron-beam cure. The coating compositions applied to the substrate may be cured at a temperature in the range of 10° C. to 375° C. for a period of less than 60 minutes, for example, less than 40 minutes, less than 30 minutes, less than 20 minutes, less than 10 minutes, less than 5 minutes, less than 2 minutes, less than 1 minute, or less than 20 seconds. All individual values and subranges from 10° C. to 375° C. are included herein and disclosed herein; for example, the coating compositions applied to the substrate may be cured at a temperature in the range of 15° C. to 260° C. for a period of less than 60 minutes, for example, less than 40 minutes, less than 20 minutes, less than 10 minutes, less than 5 minutes, less than 2 minutes, or less than 1 minute, or in the alternative, the coating composition applied to the substrate may be cured at a temperature in the range of 15° C. to 235° C. for a period of less than 60 minutes, for example, less than 40 minutes, less than 10 minutes, less than 5 minutes, less than 2 minutes, or less than 1 minute. The cured coating may have a thickness in the range of 0.01 micrometers μm to 2 millimeters mm. All individual values and subranges from 0.01 μm to 2 mm are included herein and disclosed herein; for example, the cured coating may have a thickness from a lower limit of 0.01 μm, 0.05 μm, or 1 μm, to an upper limit of 2 mm, 1.5 mm, or 1 mm. For example, the cured coating may have a thickness 0.01 μm to 2 mm; 0.05 μm to 1.5 mm; or in the alternative, 0.1 μm to 1 mm. According to a number of embodiments, the cured coating may have a thickness in a range of 1 μm to 50 μm.

As mentioned, for some coating applications, it is desirable that a coated article simultaneously provide particular performance characteristics, such as particular mechanical and chemical resistance properties and particular appearance properties. A particular mechanical property, desirable for some coating applications, is a Konig hardness value, e.g., Konig hardness values of greater than 70 seconds. Particular chemical resistance properties, desirable for some coating applications, include methyl ethyl ketone (MEK) double rub values, e.g., MEK double rub values of 200 or greater are desirable for some coating applications; passing appearance ratings following retort, e.g., 2% lactic acid solution, 3% acetic acid solution, 3% citric acid solution, and water.

EXAMPLES

In the Examples, various terms and designations for materials were used including, for example, the following:

Base polymer (high density polyethylene, DMDA-8940 NT, available from The Dow Chemical Company), polymeric performance improving agent (maleic anhydride functionalized polyethylene, AMPLIFY™ GR-204 available from The Dow Chemical Company), polymeric stabilizing agent (ethylene-acrylic acid copolymer, PRIMACOR™ 5980i, available from the Dow Chemical Company), polymeric coupling agent (maleic anhydride modified polyethylene wax, LICOCENE® PE MA 4351, available from Clariant), antioxidant (pentaerythritol tetrakis(3-(3,5-di-tert-butyl-4-hydroxyphenyl)propionate), IRGANOX™ 1010, available from BASF), neutralizing agent (dimethylethanolamine, available from Huntsman), crosslinker (hydroxyalkyl amide, PRIMID® QM-1260, available from EMS-GRILTECH), solvent (glycol ether, Butyl CELLOSOLVE™, available from the Dow Chemical Company), solvent (butanol, available from Aldrich), crosslinker (resole-formaldehyde resin, PHENODUR™ PR 612, available from CYTEC Industries), catalyst (NACURE™ 5925 available from King Industries), alcohol (diethylene glycol monoethyl ether, available from Acros Organics), alcohol (ethylene glycol, available from MEGlobal), additive (lubricant, 50% polytetrafluoroethylene dispersion in water, FLURO™ AQ 50, available from Shamrock Technologies), base polymer (polypropylene, PP 6D43 PP, available from Braskem), polymeric performance improving agent (propylene-ethylene copolymer, VERSIFY™ 4200, available from The Dow Chemical Company), polymeric coupling agent (maleic anhydride modified polypropylene wax, LICOCENE® PP MA 6452 available from Clariant).

Example 1

Coating Composition (4 wt % Polymeric Performance Improving Agent Based on the Total Weight of the Solids Content)

A coating composition, Example 1, was prepared by, as follows. An aqueous dispersion was prepared as follows. DMDA-8940 NT added at 218 grams per minute, AMPLIFY™ GR-204 added at 13 grams per minute, PRIMACOR™ 5980i, added at 72 grams per minute, and LICOCENE® PE MA 4351 added at 21 grams per minute were fed into a 25 mm diameter twin screw extruder by a controlled rate feeder where they were forwarded and melted. The extruder temperature profile was ramped up to approximately 160° C. Water and neutralizing agent were mixed together and fed to the extruder at 95 grams per minute (67 grams per minute water, 28 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 32 grams per minute. The extruder temperature profile was cooled back down to a temperature below 100° C. by the end of the extruder. The extruder speed was approximately 1200 rpm. At the extruder outlet, a backpressure regulator was used to adjust to a suitable pressure inside the extruder barrel to reduce steam formation. The aqueous dispersion was filtered through a 200 micron filter. The aqueous dispersion had a solids content of 46.9 weight percent, which was measured using an infrared solids analyzer, and a mean particle size of 0.78 microns, which was measured by a Coulter LS-13-320 particle size analyzer (Beckman Coulter Corporation). Thereafter, the filtered aqueous dispersion (25.25 grams) was added to a container. PRIMID® QM-1260 (0.15 grams) was added to the contents of the container while stirring. Basic water (11.04 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 1.

Example 2

Coating Composition (7 wt % Polymeric Performance Improving Agent Based on the Total Weight of the Solids Content)

A coating composition, Example 2, was prepared as follows. Example 2 was prepared as Example 1 with the change that DMDA-8940 NT (208 grams per minute) and AMPLIFY™ GR-204 (23 grams per minute) were used in place of DMDA-8940 NT (218 grams per minute) and AMPLIFY™ GR-204 (23 grams per minute) from Example 1. The aqueous dispersion had a solids content of 46.8 weight percent and a mean particle size of 0.67 microns. Thereafter, the filtered aqueous dispersion (25.29 grams) was added to a container. PRIMID® QM-1260 (0.15 grams) was added to the contents of the container while stirring. Basic water (11.0 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 2.

Example 3

Coating Composition (10 wt % Polymeric Performance Improving Agent Based on the Total Weight of the Solids Content A coating composition, Example 3, was prepared as follows. Example 3 was prepared as Example 1 with the change that DMDA-8940 NT (199 grams per minute) and AMPLIFY™ GR-204 (33 grams per minute) were used in place of DMDA-8940 NT (218 grams per minute) and AMPLIFY™ GR-204 (13 grams per minute) from Example 1 and, also for Example 3, water and neutralizing agent were mixed together and fed to the extruder at 96 grams per minute (67 grams per minute water, 29 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 29 grams per minute. The aqueous dispersion had a solids content of 47.0 weight percent and a mean particle size of 0.68 microns. Thereafter, the filtered aqueous dispersion (25.19 grams) was added to a container. PRIMID® QM-1260 (0.15 grams) was added to the contents of the container while stirring. Basic water (11.1 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 3.

Example 4

Coating Composition (13 wt % Polymeric Performance Improving Agent Based on the Total Weight of the Solids Content)

A coating composition, Example 4, was prepared as follows. Example 4 was prepared as Example 1 with the change that DMDA-8940 NT (189 grams per minute) and AMPLIFY™ GR-204 (42 grams per minute) were used in place of DMDA-8940 NT (218 grams per minute) and AMPLIFY™ GR-204 (13 grams per minute) from Example 1 and, also for Example 4, water and neutralizing agent were mixed together and fed to the extruder at 97 grams per minute (67 grams per minute water, 30 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 16 grams per minute. The aqueous dispersion had a solids content of 47.9 weight percent and a mean particle size of 0.77 microns. Thereafter, the filtered aqueous dispersion (24.73 grams) was added to a container. PRIMID® QM-1260 (0.15 grams) was added to the contents of the container while stirring. Basic water (11.56 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 4.

Example 5

Coating Composition (16 wt % Polymeric Performance Improving Agent Based on the Total Weight of the Solids Content)

A coating composition, Example 5, was prepared as follows. Example 5 was prepared as Example 1 with the change that DMDA-8940 NT (179 grams per minute) and AMPLIFY™ GR-204 (52 grams per minute) were used in place of DMDA-8940 NT (218 grams per minute) and AMPLIFY™ GR-204 (13 grams per minute) from Example 1 and, also for Example 5, water and neutralizing agent were mixed together and fed to the extruder at 97 grams per minute (67 grams per minute water, 30 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 20 grams per minute. The aqueous dispersion had a solids content of 47.6 weight percent and a mean particle size of 0.90 microns. Thereafter, the filtered aqueous dispersion (24.91 grams) was added to a container. PRIMID® QM-1260 (0.15 grams) was added to the contents of the container while stirring. Basic water (11.38 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 5.

Example 6

Coating Composition (20 wt % Polymeric Performance Improving Agent Based on the Total Weight of the Solids Content)

A coating composition, Example 6, was prepared as follows. Example 6 was prepared as Example 1 with the change that DMDA-8940 NT (166 grams per minute) and AMPLIFY™ GR-204 (65 grams per minute) were used in place of DMDA-8940 NT (218 grams per minute) and AMPLIFY™ GR-204 (13 grams per minute) from Example 1 and, also for Example 6, water and neutralizing agent were mixed together and fed to the extruder at 98 grams per minute (67 grams per minute water, 31 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 15 grams per minute. The aqueous dispersion had a solids content of 47.9 weight percent and a mean particle size of 0.97 microns. Thereafter, the filtered aqueous dispersion (24.74 grams) was added to a container. PRIMID® QM-1260 (0.15 grams) was added to the contents of the container while stirring. Basic water (11.27 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 6.

Example 7

Coating Composition (25% wt % Polymeric Performance Improving Agent Based on the Total Weight of the Solids Content)

A coating composition, Example 7, was prepared as follows. Example 7 was prepared as Example 1 with the change that DMDA-8940 NT (150 grams per minute) and AMPLIFY™ GR-204 (81 grams per minute) were used in place of DMDA-8940 NT (218 grams per minute) and AMPLIFY™ GR-204 (13 grams per minute) from Example 1 and, also for Example 7, water and neutralizing agent were mixed together and fed to the extruder at 99 grams per minute (67 grams per minute water, 32 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 20 grams per minute. The aqueous dispersion had a solids content of 47.5 weight percent and a mean particle size of 1.14 microns. Thereafter, the filtered aqueous dispersion (24.95 grams) was added to a container. PRIMID® QM-1260 (0.15 grams) was added to the contents of the container while stirring. Basic water (11.34 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 7.

Example 8

Coating Composition (30 wt % Polymeric Performance Improving Agent Based on the Total Weight of the Solids Content)

A coating composition, Example 8, was prepared as follows. Example 8 was prepared as Example 1 with the change that DMDA-8940 NT (133 grams per minute) and AMPLIFY™ GR-204 (98 grams per minute) were used in place of DMDA-8940 NT (218 grams per minute) and AMPLIFY™ GR-204 (13 grams per minute) from Example 1 and, also for Example 8, water and neutralizing agent were mixed together and fed to the extruder at 100 grams per minute (67 grams per minute water, 33 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 21 grams per minute. The aqueous dispersion had a solids content of 47.3 weight percent and a mean particle size of 1.53 microns. Thereafter, the filtered aqueous dispersion (25.02 grams) was added to a container. PRIMID® QM-1260 (0.15 grams) was added to the contents of the container while stirring. Basic water (11.27 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Example 8.

Example 9

Coating Composition (13 wt % Polymeric Performance Improving Agent Based on the Total Weight of the Solids Content)

A coating composition, Example 9, was prepared as follows. Example 9 was prepared as Example 4 with the change that after filtering the aqueous dispersion had a solids content of 45.95 weight percent and a mean particle size of 0.83 microns and after filtering through a 200 micron filter, 13.02 grams of the filtered dispersion were added to a container, followed by PHENODUR™ PR 612 (0.83 grams) diluted in butanol (0.50 grams), basic water (0.19 grams of water and 0.3 weight percent neutralizing agent), acetone (5.01 grams), and NACURE™ 5925 (0.10 grams). The contents of the container were covered and stirred in a SpeedMixer™ Dual Asymmetric Centrifugal Laboratory Mixer for 2 minutes at 300 RPM to provide Example 9.

Example 10

Coating Composition (7 wt % Polymeric Performance Improving Agent Based on the Total Weight of the Solids Content)

A coating composition, Example 10, was prepared as follows. Example 10 was prepared as Example 2 with the change that after filtering the aqueous dispersion through a 200 micron filter, 13.02 grams of the filtered dispersion were added to a container, followed by PRIMID® QM-1260 (0.105 grams), basic water (3.84 grams of water and 0.3 percent neutralizing agent), ethylene glycol (0.64 grams), IRGANOX™ 1010 (0.006 grams) that had been dissolved in diethylene glycol monoethyl ether (0.64 grams), and FLURO™ AQ 50 (0.547 grams). The contents of the container were covered and stirred in a SpeedMixer™ Dual Asymmetric Centrifugal Laboratory Mixer for 2 minutes at 300 RPM to provide Example 10.

Example 11

Coating Composition (10 wt % Polymeric Appearance Improving Agent Based on the Total Weight of the Solids Content)

A coating composition, Example 11, was prepared as follows. Example 11 was prepared as Example 3 with the change that PP 6D43 PP (182 grams per minute) and VERSIFY™ 4200 (30 grams per minute), LICOCENE® PP MA 6452 (23 grams per min) and PRIMACOR™ 5980i (68 grams per min) were used in place of DMDA-8940 NT (199 grams per minute), AMPLIFY™ GR-204 (33 grams per minute), LICOCENE® PE MA 4351 (21 grams per minute), and PRIMACOR™ 5980i (72 grams per minute) from Example 3 and, also for Example 11, water and neutralizing agent were mixed together and fed to the extruder at 114 grams per minute (73 grams per minute water, 41 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 16 grams per minute. The aqueous dispersion had a solids content of 45.0 weight percent and a mean particle size of 0.95 microns. Thereafter, the filtered aqueous dispersion (19.74 grams) was added to a container. PRIMID® QM-1260 (0.11 grams) was added to the contents of the container while stirring. Water (7.48 grams of water and 0.3 weight percent neutralizing agent) was added to the contents of the container while the stirring continued. Solvent (2.33 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.34 grams, 1 weight percent IRGANOX™ 1010) was added to the contents of the container while the stirring continued to provide Example 11.

Comparative Example A 0 wt % Polymeric Performance Improving Agent Based on the Total Weight of the Solids Content Comparative Example A, was prepared as follows. Comparative Example A was prepared as Example 1 with the change that DMDA-8940 NT (231 grams per minute) was used in place of DMDA-8940 NT (218 grams per minute) and AMPLIFY™ GR-204 (13 grams per minute) from Example 1, i.e. zero AMPLIFY™ GR-204 was used for Comparative Example A, and, also for Comparative Example A water and neutralizing agent were mixed together and fed to the extruder at 94 grams per minute (67 grams per minute water, 27 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 35 grams per minute. The aqueous dispersion had a solids content of 46.8 weight percent and a mean particle size of 0.78 microns. Thereafter, the filtered aqueous dispersion (25.32 grams) was added to a container. PRIMID® QM-1260 (0.15 grams) was added to the contents of the container while stirring. Water (10.98 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Comparative Example A.

Comparative Example B

1 Wt % Polymeric Performance Improving Agent Based on the Total Weight of the Solids Content Comparative Example B, was prepared as follows. Comparative Example B was prepared as Example 1 with the change that DMDA-8940 NT (228 grams per minute) and AMPLIFY™ GR-204 (3 grams per minute) were used in place of DMDA-8940 NT (218 grams per minute) and AMPLIFY™ GR-204 (13 grams per minute) from Example 1 and, also for Comparative Example B, water and neutralizing agent were mixed together and fed to the extruder at 94 grams per minute (67 grams per minute water, 27 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 32 grams per minute. The aqueous dispersion had a solids content of 47.0 weight percent and a mean particle size of 0.79 microns. Thereafter, the filtered aqueous dispersion (25.22 grams) was added to a container. PRIMID® QM-1260 (0.15 grams) was added to the contents of the container while stirring. Water (11.07 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Comparative Example B.

Comparative Example C 2 wt % Polymeric Performance Improving Agent Based on the Total Weight of the Solids Content Comparative Example C, was prepared as follows. Comparative Example C was prepared as Example 1 with the change that DMDA-8940 NT (225 grams per minute) and AMPLIFY™ GR-204 (7 grams per minute) were used in place of DMDA-8940 NT (218 grams per minute) and AMPLIFY™ GR-204 (13 grams per minute) from Example 1 and, also for Comparative Example B, water and neutralizing agent were mixed together and fed to the extruder at 94 grams per minute (67 grams per minute water, 27 grams per minute DMEA neutralizing agent) for neutralization at an initial water introduction site. Dilution water was fed via two separate pumps to two locations into a dilution zone of the extruder; at the first location dilution water was fed to the extruder at 240 grams per minute and at the second location dilution water was fed to the extruder at 28 grams per minute. The aqueous dispersion had a solids content of 47.2 weight percent and a mean particle size of 0.77 microns. Thereafter, the filtered aqueous dispersion (25.08 grams) was added to a container. PRIMID® QM-1260 (0.15 grams) was added to the contents of the container while stirring. Water (11.22 grams of water and 0.3 weight percent neutralizing agent) was added to the contents of the container while the stirring continued. Solvent (2.85 grams, 1/1 butanol to butyl CELLOSOLVE™) was added to the contents of the container while the stirring continued. IRGANOX™ 1010 that had been dissolved in 1/1 butanol to butyl CELLOSOLVE™ (0.71 grams, 1 weight percent IRGANOX™ 1010) was added to the contents of the container while the stirring continued to provide Comparative Example C.

Comparative Example D

Comparative Example D, was prepared as follows. Comparative Example D was prepared as Comparative Example A with the change that after filtering the aqueous dispersion through a 200 micron filter, 13.02 grams of the filtered dispersion were added to a container, followed by PRIMID® QM-1260 (0.105 grams), water (3.82 grams of water and 0.3 percent neutralizing agent), ethylene glycol (0.64 grams), IRGANOX™ 1010 (0.006 grams) that had been dissolved in diethylene glycol monoethyl ether (0.64 grams), and FLURO™ AQ 50 (0.547 grams). The contents of the container were covered and stirred in a SpeedMixer™ Dual Asymmetric Centrifugal Laboratory Mixer for 2 minutes at 300 RPM to provide Comparative Example D.

Example 12

Coated Article

A coated article, Example 12, was prepared as follows. Electrolytic tinplates (0.25# Bright T-1 measuring 0.009×4"× 12" from Lakeside Metals), were cleaned with acetone, and then dried. Approximately 12 hours after Example 1 was prepared, Example 1 (approximately 3 grams) was applied to the tinplate via a #16 wirewound drawdown bar to coat (20 microns to 30 microns wet coating thickness) a surface of the tinplate to provide Example 12.

Examples 13-19

Coated Articles

Coated articles, Examples 13-19, were prepared as follows. Examples 13-19 were prepared as Example 12 with the change that Examples 2-8 were respectively used in place of Example 1.

Example 20

Coated Article

A coated article, Example 20, was prepared as follows. An aluminum panel (end stock clean aluminum measuring 0.008×8"×12" from Novelis, Inc.), was cleaned with acetone, and then dried. Approximately 12 hours after Example 9 was prepared, Example 9 (approximately 3 grams) was applied to the aluminum panel via a #13 wirewound drawdown bar to coat (20 microns to 30 microns wet coating thickness) a surface of the aluminum panel to provide Example 20.

Example 21

Coated Article

Coated article, Example 21, was prepared as follows. Example 21 was prepared as Example 20 with the change that Example 10 was used in place of Example 9.

Example 22

Coated Article

Coated article, Example 22, was prepared as follows. Example 22 was prepared as Example 12 with the change that Example 11 was used in place of Example 1.

Comparative Examples E-G

Comparative Examples E-G were prepared as follows. Comparative Examples E-G were prepared as Example 11 with the change that Comparative Examples A-C were respectively used in place of Example 1.

Comparative Example H

Comparative Example H was prepared as follows. Comparative Example H was prepared as Example 20 with the change that Comparative Example D was used in place of Example 10.

Example 23

Coated Article with Cured Coating

A coated article with a cured coating, Example 23, was prepared as follows. Example 12 was placed in a 204° C. convention oven for approximately 4 minutes to cure the coating composition and provide Example 23.

Examples 24-30

Coated Articles with Cured Coatings

Coated articles with cured coatings, Examples 24-30, were prepared as follows. Examples 24-30 were prepared as Example 23 with the change that Examples 13-19 were respectively used in place of Example 12.

Example 31

Coated Article with Cured Coating

A coated article with cured coating, Example 31, was prepared as follows. Example 31 was prepared as Example 23 with the change that Example 20 was used in place of Example 12 and Example 20 was placed in a 295° C. convention oven for approximately 25 seconds to cure the coating composition and provide Example 31.

Example 32

Coated Article with Cured Coating

Coated article, Example 32, was prepared as follows. Example 32 was prepared as Example 31 with the change that Example 21 was used in place of Example 20.

Example 33

Coated Article with Cured Coating

Coated article, Example 33, was prepared as follows. Example 33 was prepared as Example 23 with the change that Example 22 was used in place of Example 12.

Comparative Examples I-K

Comparative Examples I-K were prepared as follows. Comparative Examples I-K were prepared as Example 21 with the change that Comparative Examples E-G were respectively used in place of Example 11.

Comparative Example L

Comparative Example L was prepared as Example 31 with the change that that Comparative Example H was used in place of Example 20.

Konig hardness values were determined for Examples 23-30, 33, and Comparative Examples 1-K by ASTM D4366-95. Konig hardness values are reported in Table 1.

MEK double rub values were determined for Examples 23-33, and Comparative Examples 1-L using the round end of a 1.5 pound ball peen hammer to apply a force to the respective coatings. A 4 inch×4 inch square of cheesecloth was bound around the hammer end and soaked with methyl ethyl ketone (MEK). The hammer was brought into contact with the respective coatings, and moved forth-and-back over a section measuring approximately 6 inches×1 inch, wherein one movement forth-and-back over the coating was defined as one double rub. Double rubs were performed at a rate of approximately one double rub per second. No additional pressure was applied to the hammer or the respective coatings. After every 25 double rubs, the cheesecloth was re-soaked with MEK. The double rub step was repeated until the coating was rubbed off, i.e. at least a portion of the metal substrate was exposed, excluding the 0.5 inch end sections of the tested areas. MEK double rub values are reported in Table 1.

TABLE 1

| | Konig Hardness (seconds) | Methyl ethyl ketone double rubs |
|---|---|---|
| Example 23 | 90 | 200+ |
| Example 24 | 85 | 200+ |
| Example 25 | 89 | 200+ |
| Example 26 | 90 | 200+ |
| Example 27 | 83 | 200+ |
| Example 28 | 89 | 200+ |
| Example 29 | 89 | 200+ |
| Example 30 | 94 | 200+ |
| Example 31 | — | 200+ |
| Example 32 | — | 200+ |
| Example 33 | 110 | 200+ |
| Comparative Example I | 71 | 200+ |
| Comparative Example J | 98 | 200 |
| Comparative Example K | 92 | 200 |
| Comparative Example L | — | 143 |

The data in Table 1 show that each of Examples 23-30, and 33 had a Konig hardness value greater than 70 seconds. These Konig hardness values of greater than 70 seconds are desirable for some coating applications. Additionally, the data in Table 1 show that each of Examples 23-33 had a MEK double rub value of 200 or greater. These MEK double rub value of 200 or greater are desirable for some coating applications.

Examples 23-30, 33, and Comparative Examples I-K were respectively immersed in a 2% lactic acid solution in individual pressurizable glass beakers that were contained in a secondary container tray, and placed into a Tuttnauer 10" dia×18" Deep Chamber Autoclave model 1 Z-TUT-EZ-10 where they were retorted at 129° C. for 90 minutes. Thereafter, appearance ratings, blush ratings, and adhesion ratings for Examples 23-30, 33 and Comparative Examples I-K were determined.

Appearance ratings for Examples 23-30, 33 and Comparative Examples I-K were determined by visual inspection according to a qualitative scale, whereby an appearance rating of "film dissolving" indicated prominent holes in the cured coating, exposed metal, and/or extensive surface roughness and an appearance rating of "passing" indicated a smooth continuous coating having no visible defects. Appearance ratings are reported in Table 2.

Blush ratings for Examples 23-30, 33 and Comparative Examples I-K were determined by visual inspection according to a qualitative scale, whereby a blush rating of "5" indicated no blush, a blush rating of "4" indicated very slight blush, a blush rating of "3" indicated slight blush, a blush rating of "2" indicated blush, and a blush rating of "1" indicated strong blush. Blush ratings are reported in Table 2.

Adhesion ratings for Examples 23-30, 33 and Comparative Examples I-K were determined by cross-cut adhesion is measured according to ASTM-D 3359-02-Measuring adhesion by tape test, Method B, using a BYK 1.5 mm, 11 blade cross-cut tester. This method included applying and removing a Scotch #410 double sided tape over the cuts made in the coated article. To ensure good contact with the coated article the tape was firmly rubbed with a wooden tongue blade. Within 90±30 seconds of tape application, the tape was removed by seizing the free end and rapidly (without jerking) pulling it off at as close to an angle of 180 degrees as possible. The grid area was inspected for removal of coating from the substrate. An adhesion rating of "5" indicated that edges of the cuts were completely smooth, none of the squares of the lattice were detached; an adhesion rating of "4" indicated that small flakes of the coating were detached at intersections, less than 5% of the area was affected; an adhesion rating of "3" indicated that small flakes of the coating were detached along the edges and at intersections of cuts, the area affected was 5-15% of the lattice; an adhesion rating of "2" indicated that the coating had flaked along the edges and on parts of the squares, the area affected was 15-35% of the lattice; and adhesion rating of "1" indicated that the coating had flaked along the edges of cuts in large ribbons and whole squares had detached, the area affected was 35-65% of the lattice; and an adhesion rating of "0" indicated that flaking and detachment was more severe that for adhesion rating "1".

Examples 23-30, 33 and Comparative Examples 1-K were respectively immersed in a 3% acetic acid solution in individual pressurizable glass beakers that were contained in a secondary container tray, and placed into a Tuttnauer 10" dia×18" Deep Chamber Autoclave model 1 Z-TUT-EZ-10 where they were retorted at 129° C. for 90 minutes. Thereafter, appearance ratings, blush ratings, and adhesion ratings for Examples 23-30, 33 and Comparative Examples I-K were determined as described herein. Appearance ratings, blush ratings, and adhesion ratings are reported in Table 2.

Examples 23-30, 33 and Comparative Examples I-K were respectively immersed in a 3% citric acid solution in individual pressurizable glass beakers that were contained in a secondary container tray, and placed into a Tuttnauer 10" dia×18" Deep Chamber Autoclave model 1 Z-TUT-EZ-10 where they were retorted at 129° C. for 90 minutes. Thereafter, appearance ratings, blush ratings, and adhesion ratings for Examples 23-30, 33 and Comparative Examples I-K were determined as described herein. Appearance ratings, blush ratings, and adhesion ratings are reported in Table 2.

Examples 31-32 and Comparative Example L were respectively immersed in a 2% lactic acid solution in individual pressurizable glass beakers that were contained in a secondary container tray, and placed into a Tuttnauer 10" dia×18" Deep Chamber Autoclave model 1 Z-TUT-EZ-10 where they were retorted at 121° C. for 30 minutes. Thereafter, appearance ratings, blush ratings, and adhesion ratings for Examples 31-32 and Comparative Example L were determined as described herein. Appearance ratings, blush ratings, and adhesion ratings are reported in Table 3.

TABLE 2

| | Retort 2% lactic acid (129° C., 90 minutes) | | | Retort 3% acetic acid (129° C., 90 minutes) | | | Retort 3% citric acid (129° C., 90 minutes) | | |
|---|---|---|---|---|---|---|---|---|---|
| | Appearance rating | Blush rating | Adhesion rating | Appearance rating | Blush rating | Adhesion rating | Appearance rating | Blush rating | Adhesion rating |
| Example 23 | passing | 2 | 5 | passing | 2 | 5 | passing | 5 | 5 |
| Example 24 | passing | 2 | 5 | passing | 2 | 5 | passing | 5 | 5 |
| Example 25 | passing | 2 | 5 | passing | 2 | 4 | passing | 5 | 5 |
| Example 26 | passing | 1 | 5 | passing | 2 | 3 | passing | 5 | 5 |
| Example 27 | passing | 2 | 5 | passing | 2 | 4 | passing | 5 | 5 |
| Example 28 | passing | 1 | 3 | passing | 2 | 4 | passing | 5 | 5 |
| Example 29 | passing | 1 | 3 | passing | 2 | 4 | passing | 5 | 5 |
| Example 30 | passing | 1 | 2 | passing | 2 | 3 | passing | 5 | 5 |
| Example 33 | passing | 4 | 4 | passing | 5 | 5 | passing | 5 | 5 |
| Comparative Example I | film dissolving | 3 | 3 | film dissolving | 2 | 4 | film dissolving | 4 | 5 |
| Comparative Example J | film dissolving | 2 | 5 | film dissolving | 2 | 5 | film dissolving | 3 | 5 |
| Comparative Example K | film dissolving | 2 | 5 | film dissolving | 2 | 5 | film dissolving | 3 | 5 |

TABLE 3

| | Retort 2% lactic acid (121° C., 30 minutes) | | |
|---|---|---|---|
| | Appearance rating | Blush rating | Adhesion rating |
| Example 31 | passing | 4 | 5 |
| Example 32 | passing | 4 | 5 |
| Comparative Example L | passing | 5 | 0 |

The data in Tables 2-3 show that each of Examples 23-33 had improved appearance rating values, as compared to Comparative Examples I-K. These improved appearance rating values, as compared to Comparative Examples I-K, are desirable for some coating applications. Comparative Example L did have a passing appearance rating value, however, Comparative Example L had a MEK double rub value of 143, which is undesirable for some coating applications.

Scanning Electron Microscopy (SEM) was performed on Example 23, Example 25, Example 27, Example 28, Example 30, and Comparative Example I by depositing a thin layer of platinum respectively onto each of the coated articles with cured coatings, which were then mounted onto an aluminum stub and imaged with a FEI Nova NanoSEM operating at 3 kV and a spot size of 4.5.

Figure 6:
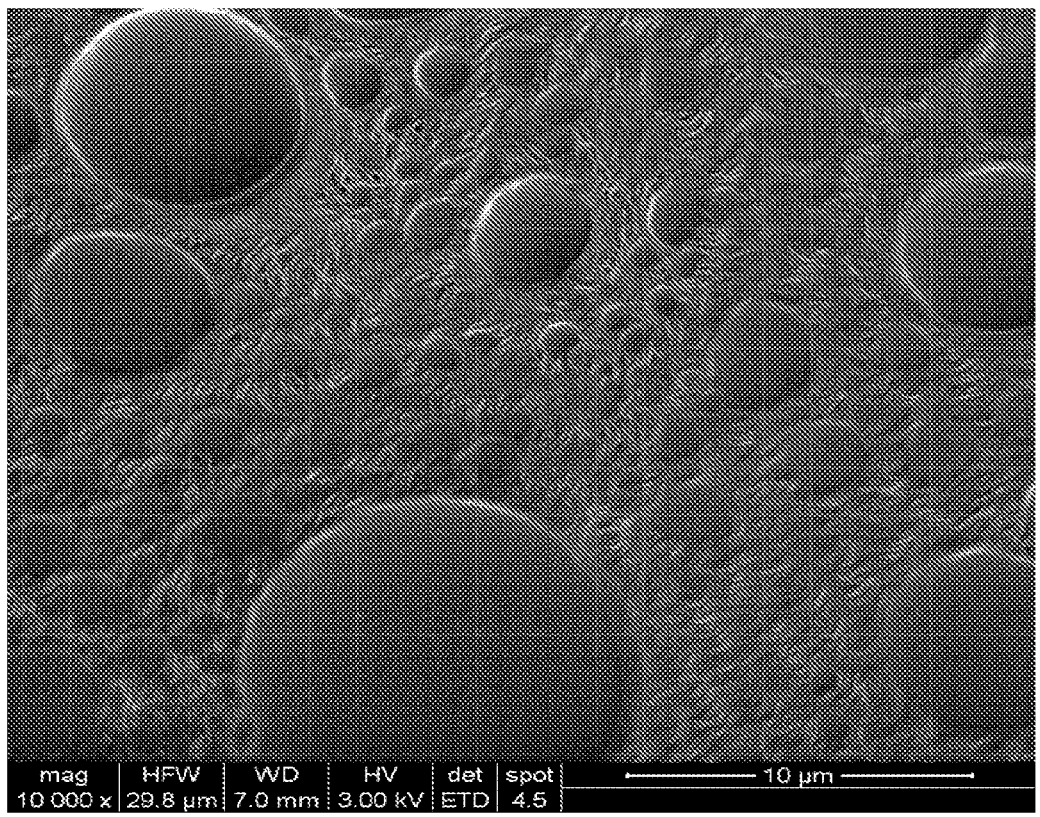
FIG. 6 illustrates a scanning electron microscope (SEM) image of Comparative Example I.

As seen in FIGS. 1-5, each of Examples 23, 25, 27, 28, and 30 had smaller domains, compared to Comparative Example 1, as seen in FIG. 6. While not being bound to theory, it is believed that these comparatively smaller domains indicate that the presence of the polymeric appearance improving agent, which is from 4 to 35 percent by weight of the aqueous dispersion, helps to compatibilize components of the aqueous dispersion and helps to provide particular mechanical and chemical resistance properties, as discussed herein, while simultaneously providing particular appearance properties, as discussed herein, which are desirable for some coating applications.

Example 34

Coating Composition (Spray Formulation)

A spray formulation, Example 34, was prepared as follows. Example 34 was prepared as Example 4 to form the aqueous dispersion. 1500 grams of the aqueous dispersion was added to a container, 9.93 Primid QM1260 (9.93 grams) neutralizing solution (1403.15 grams, 0.3 weight % DMEA in water) was added to the contents of the container. IRGANOX™ 1010 (0.54 grams) that had been dissolved in 1/1 butanol to butyl CELLOSOLVE™ (253.2 grams) and butanol (253.2 grams) were added to the contents of the container to provide Example 34.

Example 35

Coated Article

A coated article, Example 35, was prepared as follows. Example 34 was sprayed onto an aluminum beverage can substrate with a Nordson lab spray coater to provide Example 35.

Example 36

Coated Article with Cured Coating

A coated article with a cured coating, Example 36, was prepared as follows. Example 35 was placed in a 204° C. convention oven for approximately 4 minutes to cure the coating composition and provide Example 36.

What is claimed:

1. A coating composition comprising:
   from 20 to 85 percent of an aqueous dispersion based on a total weight of the coating composition, wherein the aqueous dispersion comprises a melt blending product of (a) a polymer of polypropylene having a melt index value of at least 30 as measured by ASTM D-1238, (b) a propylene-ethylene copolymer having a melt index value of less than 30 as measured by ASTM D-1238 (c) a polymeric stabilizing agent, and (d) a compatiblizer, wherein the aqueous dispersion has a solid content from 15 weight percent to 70 weight percent based on a total weight of the aqueous dispersion, the solid content comprises from 40 to 80 percent by weight of the polymer of polypropylene based on a total weight of the solids content, from 3 to 35 percent by weight of the propylene-ethylene copolymer based on the total weight of the solids content, from 2 to 35 percent by weight of the polymeric stabilizing agent based on the total weight of the solids content, and from 5 to 15 percent by weight of the compatiblizer based on the total weight of the solids content;
   a basic water composition comprising from 90 to 99.99 percent by weight of water based on a total weight of the basic water composition and from 0.01 percent to 10 percent by weight of a neutralizing agent based on the total weight of the basic water composition, wherein the basic water composition is from 0 weight percent to 80 weight percent of the coating composition based on the total weight of the coating composition; and
   a crosslinker, wherein the crosslinker is from 0 weight percent to 40 weight percent of the coating composition based on the total weight of the coating composition.

2. The coating composition of claim 1, wherein the polymer of polypropylene includes a propylene-ethylene copolymer having a melt index value of at least 30 as measured by ASTM D-1238.

3. The coating composition of claim 1, wherein the propylene-ethylene copolymer is selected from a propylene-ethylene alternating copolymer or a propylene-ethylene diblock copolymer.

4. The coating composition of claim 1, wherein the crosslinker comprises a hydroxylalkyl amide.

5. The coating composition of claim 1, wherein the crosslinker comprises a resole-formaldehyde resin.

6. The coating composition of claim 1, wherein the polymeric stabilizing agent is selected from the group consisting of ethylene-acrylic acid copolymer, ethylene-methacrylic acid copolymer, and combinations thereof.

7. The coating composition of claim 1, wherein the compatiblizer comprises a maleic anhydride modified polypropylene wax.

8. A coated article comprising a substrate and a coating on the substrate, wherein the coating includes a coating composition comprising:
   from 20 to 85 percent of an aqueous dispersion based on a total weight of the coating composition, wherein the aqueous dispersion comprises a melt blending product of (a) a polymer of polypropylene having a melt index value of at least 30 as measured by ASTM D-1238, (b) a propylene-ethylene copolymer having a melt index value of less than 30 as measured by ASTM D-1238 (c) a polymeric stabilizing agent, and (d) a compatiblizer, wherein the aqueous dispersion has a solid content from 15 weight percent to 70 weight percent based on a total weight of the aqueous dispersion, the solid content comprises from 40 to 80 percent by weight of the polymer of polypropylene based on a total weight of the solids content, from 3 to 35 percent by weight of the propylene-ethylene copolymer based on the total weight of the solids content, from 2 to 35 percent by weight of the polymeric stabilizing agent based on the total weight of the solids content, and from 5 to 15 percent by weight of the compatiblizer based on the total weight of the solids content;

a basic water composition comprising from 90 to 99.99 percent by weight of water based on a total weight of the basic water composition and from 0.01 percent to 10 percent by weight of a neutralizing agent based on the total weight of the basic water composition, wherein the basic water composition is from 0 weight percent to 80 weight percent of the coating composition based on the total weight of the coating composition; and a crosslinker, wherein the crosslinker is from 0 weight percent to 40 weight percent of the coating composition based on the total weight of the coating composition.

9. The coated article of claim 8, wherein the coating has a thickness in the range of from 0.01 micrometers to 2 millimeters.

10. The coated article of claim 8, wherein the substrate comprises a metal substrate.

11. The coated article of claim 8, wherein the coating composition is applied to the substrate by roller coating, spray coating, coil coating, or a combination thereof.

12. A coated article comprising a substrate and a cured coating on the substrate, wherein the cured coating is formed by curing a coating composition comprising from 20 to 85 percent of an aqueous dispersion based on a total weight of the coating composition, wherein the aqueous dispersion comprises a melt blending product of (a) a polymer of polypropylene having a melt index value of at least 30 as measured by ASTM D-1238, (b) a propylene-ethylene copolymer having a melt index value of less than 30 as measured by ASTM D-1238 (c) a polymeric stabilizing agent, and (d) a compatiblizer, wherein the aqueous dispersion has a solid content from 15 weight percent to 70 weight percent based on a total weight of the aqueous dispersion, the solid content comprises from 40 to 80 percent by weight of the polymer of polypropylene based on a total weight of the solids content, from 3 to 35 percent by weight of the propylene-ethylene copolymer based on the total weight of the solids content, from 2 to 35 percent by weight of the polymeric stabilizing agent based on the total weight of the solids content, and from 5 to 15 percent by weight of the compatiblizer based on the total weight of the solids content;

a basic water composition comprising from 90 to 99.99 percent by weight of water based on a total weight of the basic water composition and from 0.01 percent to 10 percent by weight of a neutralizing agent based on the total weight of the basic water composition, wherein the basic water composition is from 0 weight percent to 80 weight percent of the coating composition based on the total weight of the coating composition; and a crosslinker, wherein the crosslinker is from 0 weight percent to 40 weight percent of the coating composition based on the total weight of the coating composition.

13. The coated article of claim 12, wherein the cured coating has a thickness in the range of from 0.01 micrometers to 2 millimeters and the substrate is a metal substrate.

* * * * *